United States Patent
Landais et al.

(10) Patent No.: US 12,402,052 B2
(45) Date of Patent: Aug. 26, 2025

(54) NF SERVICE PRODUCER'S URIs FOR INTER-PLMN MOBILITY

(71) Applicant: NOKIA SOLUTIONS AND NETWORKS OY, Espoo (FI)

(72) Inventors: Bruno Landais, Pleumeur-Bodou (FR); Ioannis Mouroulis, Athens (GR); Alex Moukalled, Naperville, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 408 days.

(21) Appl. No.: 18/094,686

(22) Filed: Jan. 9, 2023

(65) Prior Publication Data
US 2023/0224782 A1    Jul. 13, 2023

(30) Foreign Application Priority Data
Jan. 7, 2022    (EP) ..................................... 22150604

(51) Int. Cl.
*H04W 36/14*    (2009.01)
*H04W 36/00*    (2009.01)

(52) U.S. Cl.
CPC ........ *H04W 36/14* (2013.01); *H04W 36/0011* (2013.01)

(58) Field of Classification Search
CPC .......................... H04W 36/14; H04W 36/0011
See application file for complete search history.

(56) References Cited

U.S. PATENT DOCUMENTS

| | | | |
|---|---|---|---|
| 2020/0404551 A1 | 12/2020 | Wang | |
| 2023/0291809 A1* | 9/2023 | Lu | ........................ H04L 67/2871 |
| 2023/0309005 A1* | 9/2023 | Rodrigo | .................. H04L 67/56 |
| 2024/0073095 A1* | 2/2024 | Yang | ................... H04L 41/0893 |

OTHER PUBLICATIONS

3GPP TS 23.502 V18.0.0 (Dec. 2022), Technical Specification, 3rd Generation Partnership Project; Technical Specification Group Services and System Aspects; Procedures for the 5G System (5GS); Stage 2 (Release 18), Dec. 2022.

(Continued)

*Primary Examiner* — Justin Y Lee
(74) *Attorney, Agent, or Firm* — SQUIRE PATTON BOGGS (US) LLP

(57) ABSTRACT

An apparatus and method can include monitoring whether a consumer of a target network receives a resource identifier, a first apiRoot identifying a producer, and a second apiRoot identifying the producer and a producer network. The first apiRoot is for routing a service request to the producer, and the second apiRoot is for routing the service request to the producer if the target network is different from the producer network. The method further comprises identifying the producer network based on the second apiRoot, and deciding whether the target network is different from the producer network. If the target network is not different from the producer network, the service request is sent wherein the resource is identified by the first apiRoot and the identifier. If the target network is different from the producer network, the service request is sent wherein the resource is identified by the second apiRoot and the identifier.

19 Claims, 10 Drawing Sheets

(56) References Cited

OTHER PUBLICATIONS

T. Berners-Lee et al., "Uniform Resource Identifier (URI) : Generic Syntax", Network Working Group; Category: Standards Track. Jan. 2005. pp. 1-61.

3GPP TS 23.003 V18.0.0 (Dec. 2022), Technical Specification, 3rd Generation Partnership Project; Technical Specification Group Core Network and Terminals; Numbering, addressing and identification; (Release 18), Dec. 2022.

3GPP TSG-CT Meeting #93. "CR Pack on Service based interface protocol improvements", Sep. 13, 2021-Sep. 15, 2021.

3GPP TS 29.500 V17.5.0 (Dec. 2021), Technical Specification, 3rd Generation Partnership Project; Technical Specification Group Core Network and Terminals; 5G System; Technical Realization of Service Based Architecture; Stage 3 (Release 17), Dec. 2021.

3GPP TS 29.501 V17.4.1 (Dec. 2021), Technical Specification, 3rd Generation Partnership Project; Technical Specification Group Core Network and Terminals; 5G System; Principles and Guidelines for Services Definition; Stage 3 (Release 17), Dec. 2021.

3GPP TS 33.501 V17.4.0 (Dec. 2021), Technical Specification, 3rd Generation Partnership Project; Technical Specification Group Services and System Aspects; Security architecture and procedures for 5G system (Release 17), Dec. 2021.

3GPP TS 29.518 V17.4.0 (Dec. 2021), Technical Specification, 3rd Generation Partnership Project; Technical Specification Group Core Network and Terminals; 5G System; Access and Mobility Management Services; Stage 3 (Release 17), Dec. 2021.

Nokia et al., "Event subscriptions with Inter PLMN and Intra PLMN callback URIs," 3GPP Draft; C4-216336, 3GPP TSG-CT WG4 Meeting #107-e, E-Meeting, Nov. 15-23, 2021, Nov. 5, 2021, XP052073888.

3GPP TS 29.502 V16.10.0 (Dec. 2021), Technical Specification, 3rd Generation Partnership Project; Technical Specification Group Core Network and Terminals; 5G System; Session Management Services; Stage 3 (Release 16), Dec. 2021.

Extended European Search Report dated Jun. 24, 2022 corresponding to European Patent Application No. 22150604.1.

Communication under Rule 71(3) EPC dated Apr. 3, 2025 corresponding to European Patent Application No. 22150604.1.

\* cited by examiner cont'd. on Fig. 1B

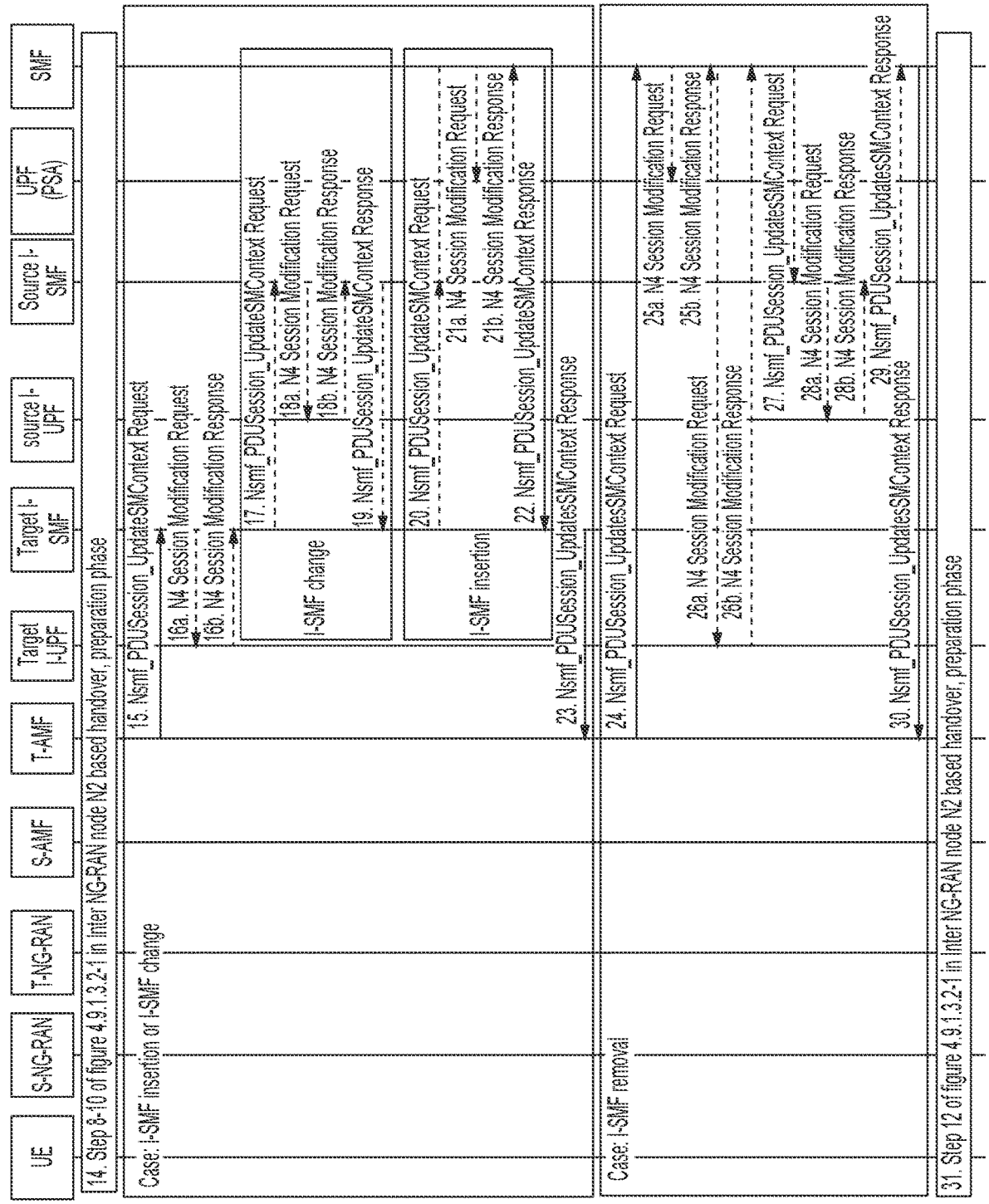

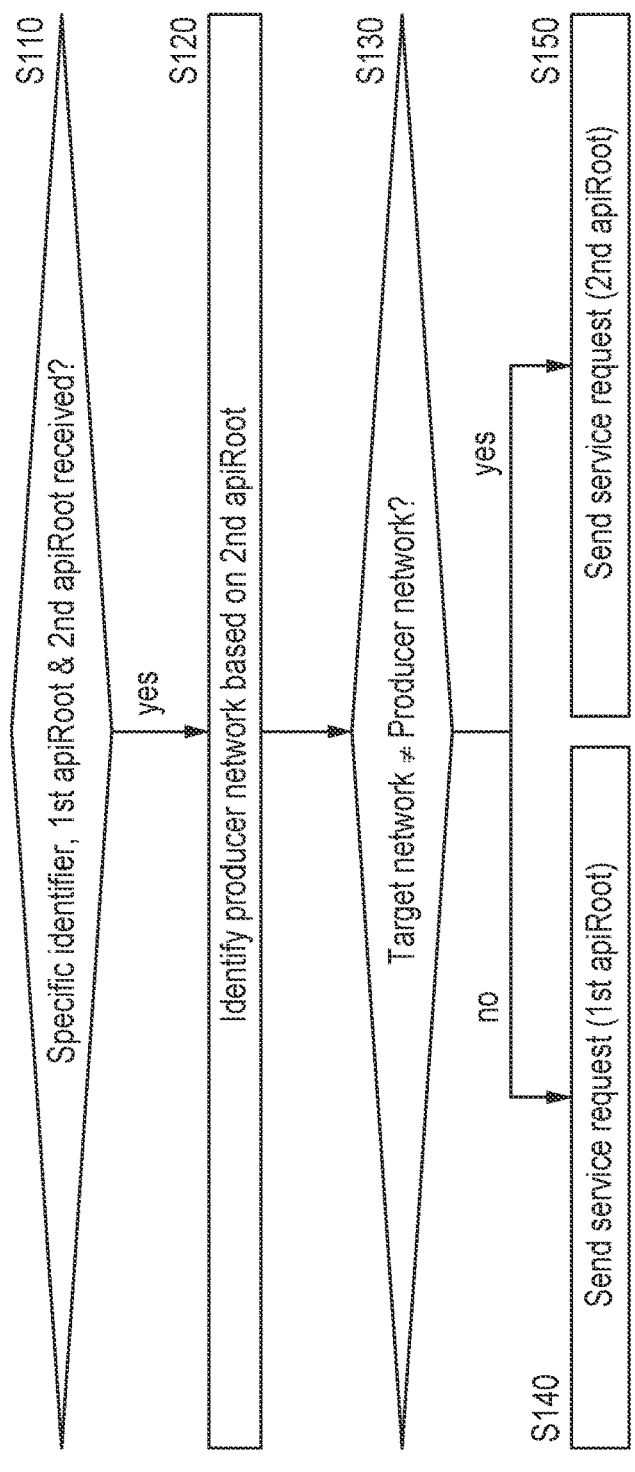

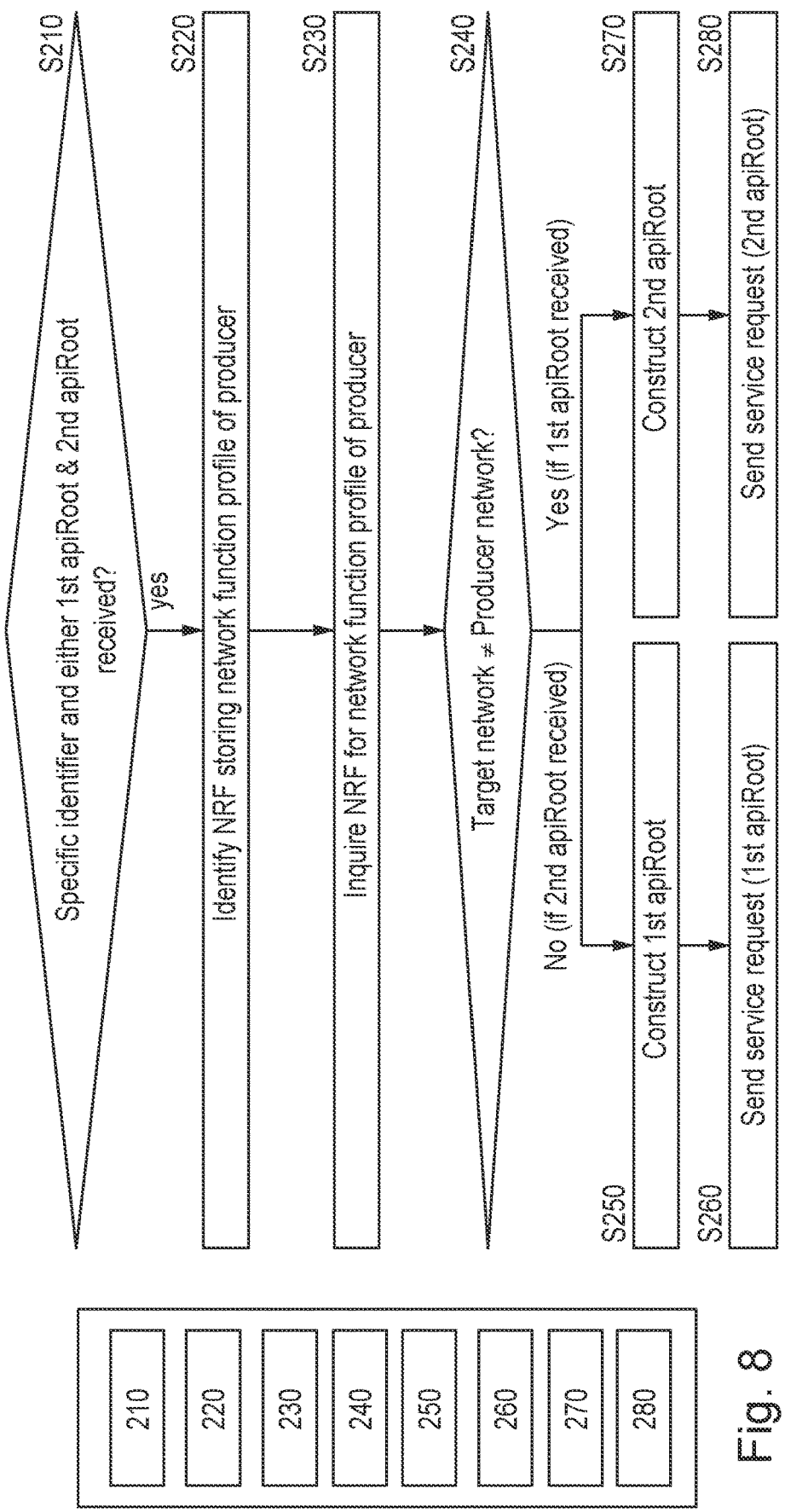

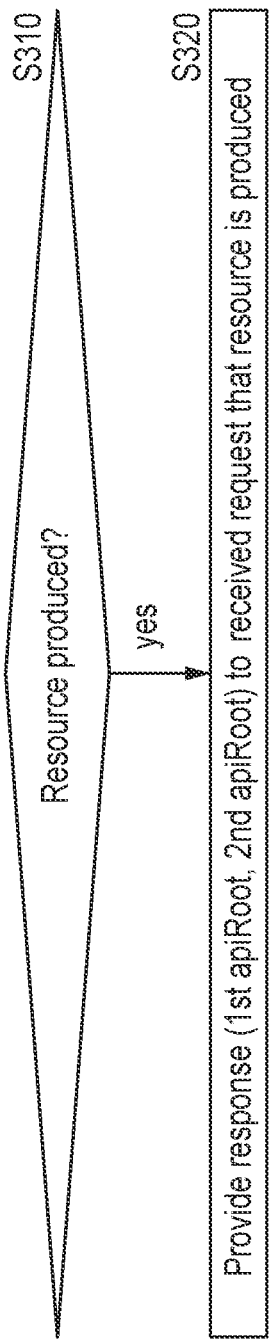
Fig. 11
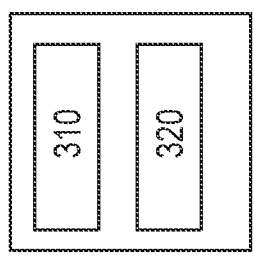
FIG. 10
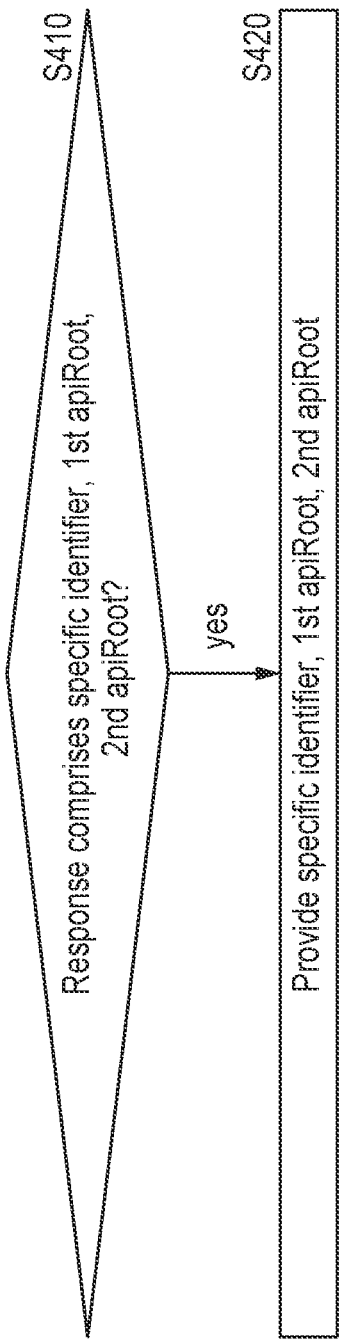
Fig. 13
FIG. 12

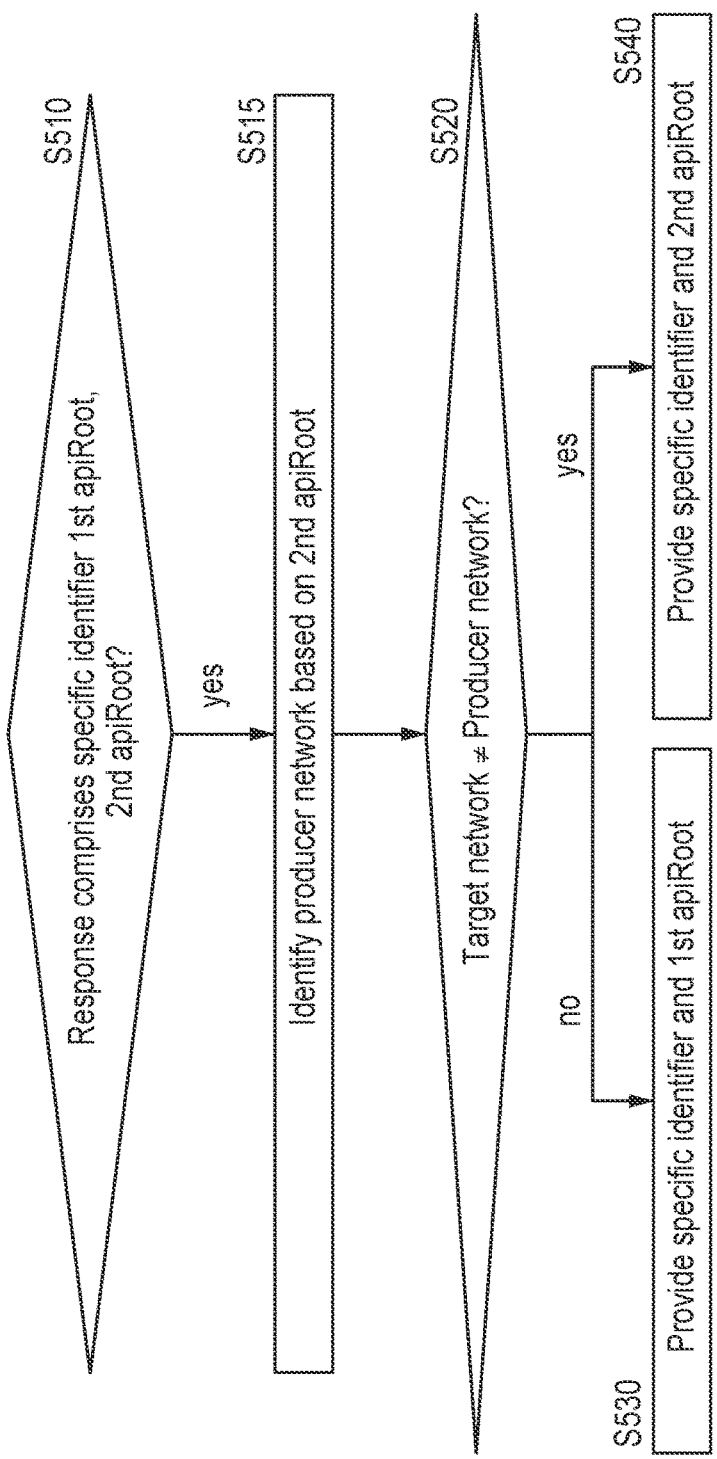
Fig. 15
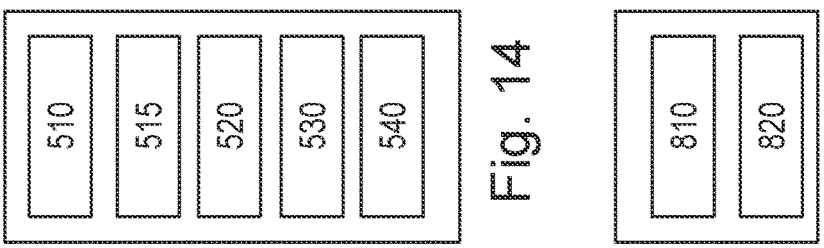
Fig. 14
Fig. 16

NF SERVICE PRODUCER'S URIs FOR INTER-PLMN MOBILITY

CROSS REFERENCE TO RELATED APPLICATION

This application claims the benefit of European Patent Application No. 22150604.1, filed Jan. 7, 2022. The entire content of the above-referenced application is hereby incorporated by reference.

FIELD OF THE INVENTION

The present disclosure relates to mobility between service based networks. In particular, it relates to the URIs in case of mobility.

ABBREVIATIONS

3GPP 3$^{rd}$ Generation Partnership Project
5G/6G/7G 5$^{th}$/6$^{th}$/7$^{th}$ Generation
5GC 5G Core network
AMF Access and Mobility Function
API Application Programming Interface
CHF Charging Function
DN Data Network
DNAI Data Network Access Identifier
DNN Data Network Name
DTSSA Deployments Topologies with specific SMF Service Areas
EPS Evolved Packet System
FQDN Fully Qualified Domain Name
HPLMN Home PLMN
HR Home Routing
H-SMF Home SMF
HTTP Hypertext Transfer Protocol
HTTPs HTTP secure
ID Identifier
IE Information Element
IETF Internet Engineering Task Force
IP Internet Protocol
I-SMF Intermediate SMF
I-UPF Intermediate UPF
JSON JavaScript Object Notation
LBO Local Breakout
MCC Mobile Country Code
MNC Mobile Network Code
NF Network Function
NFc Network Function Consumer
NFp Network Function Producer
NG Next Generation
NRF Network Repository Function
PCF Policy Control Function
PDU Protocol Data Unit
PLMN Public Land Mobile Network
PSA PDU Session Anchor
RAN Radio Access Network
RFC Request for Comments
S-AMF Source AMF
SBA Service Based Architecture
SCP Service Communication Proxy
SM Session Management
SMF Session Management Function
S-NSSAI Single—Network Slice Selection Assistance Information
T-AMF Target AMF
TS Technical Specification
UE User Equipment
UPF User Plane Function
URI Unified Resource Identifier
VPLMN Visited PLMN
V-SMF Visited SMF

SUMMARY

The 5GC (5G Core network) has been defined as a Service Based Architecture (SBA), with NF service producers (NFp) exposing services to NF service consumers (NFc). NF service producers register their NF profile in an Network Repository Function (NRF). The NF profile contains NF level specific information and the list of NF service instances supported by the NF with their associated attributes.

When an NFc (e.g. AMF) creates a resource (e.g. a SM context resource, i.e. a PDU session) at the NFp (e.g. SMF), the NFp returns the URI of the created resource to the NFc. This URI is used by the NFc to send subsequent requests to the NFp targeting the specific resource, e.g. to modify or delete the resource. Routing of HTTP messages in the 5GC relies on Request URIs as specified in clause 6.1. of 3GPP TS 29.500.

The structure of a resource URI is defined in clause 4.4.1 of 3GPP TS 29.501. In short, it is structured as follows: {apiRoot}/<apiName>/<apiVersion>/<apiSpecificResourceUriPart>
where the "apiRoot" shall be a concatenation of the following parts:
scheme ("http" or "https")
NOTE: In this release of the specification both http and https scheme URIs are allowed. See clause 13.1 of 3GPP TS 33.501 for further details on security of Service Based Interfaces.
the fixed string "://"
authority (host and optional port) as defined in IETF RFC 3986
an optional deployment-specific string (API prefix) that starts with a "/" character.

For inter-PLMN signaling, the authority in the apiRoot shall be encoded as an FQDN terminating by the home network domain of the NFp as defined in clause 6.1 of 3GPP TS 29.500 and clause 28.2 of 3GPP TS 23.003. This is required to allow the routing of the message towards the target PLMN. This means that the URI shall take the form of:
<one or more labels identifying the NFp>0.5gc.mnc<MNC>.mcc<MCC>0.3gppnetwork.org
where the MCC and MNC identify the PLMN of the NFp.
The authority of the NFp used for intra-PLMN signaling is not constrained by 3GPP and is left to the choice of operators. For instance, the authority may take the form of an IP address (rather than an FQDN), or an FQDN freely determined by the operator (as also configured in the operator's network DNS):
<one or more labels identifying the NFp>.<operator name>.com
An operator may want to use different HTTP schemes for intra-PLMN and inter-PLMN signalling (e.g. http for intra-PLMN traffic but https for inter-PLMN).
The NF profile registered in the NRF allows to register intra-PLMN and inter-PLMN authority information. A requester NF from a different PLMN than the NFp retrieves the NFp profile from the NRF including only the inter-PLMN authority information.

Table 1 shows part of the PDU session context information exchanged during inter-AMF mobility.

Table 2 shows part of the SM context information exchanged between V-/I-SMFs in scenarios with a change of V-SMF or I-SMF.

Note on 3GPP terminology used for contexts created in SMF for a PDU session:
  the context created in the V-SMF, I-SMF is called an "SM context".
  the context created in the anchor SMF (when the PDU session has an I-SMF or V-SMF) is called a "PDU session context".

When the UE is outside of the SMF Service Area, or current SMF cannot serve the target DNAI for the traffic routing towards Local DN, an I-SMF is inserted between the SMF and the AMF. The I-SMF has a N11 interface with the AMF and a N16a interface with the SMF and is responsible of controlling the UPF(s) that the SMF cannot directly control. The exchange of the SM context and forwarding of tunnel information if needed are done between two SMFs directly without involvement of AMF.

Depending on scenario, a PDU Session in non-roaming case or local breakout is either served by a single SMF or served by an SMF and an I-SMF. When a PDU Session is served by both an SMF and an I-SMF, the SMF is the NF instance that has the interfaces towards the PCF and CHF.

TABLE 1

3GPP TS 29.518, Table 6.1.6.2.37-1: Definition of type PduSessionContext

| Attribute name | Data type | P | Cardinality | Description | Applicability |
| --- | --- | --- | --- | --- | --- |
| pduSessionId | PduSessionId | M | 1 | Indicates the identifier of the PDU Session. | |
| smContextRef | Uri | M | 1 | Indicates the resource URI of the SM context, including the apiRoot (see clause 6.1.3.3.2 of 3GPP TS 29.502 [16]). When present, it shall carry the URI of SM Context of: I-SMF, for a PDU session with I-SMF; or V-SMF, for HR PDU session; or SMF, for non-roaming PDU session without I-SMF, or LBO roaming PDU session; | |
| . . . | . . . | | | | |
| hsmfId | NfInstanceId | C | 0 . . . 1 | This IE shall be present for non-roaming and home-routed PDU sessions. When present, it shall indicate the associated: home SMF for HR PDU Session, or SMF, for non-roaming PDU session, regardless of whether an I-SMF is involved or not. | |
| hsmfSetId | NfSetId | C | 0 . . . 1 | This IE shall be present, if available. When present, this IE shall contain the NF Set ID of the home SMF or the SMF indicated by hsmfId. | |
| vsmfId | NfInstanceId | C | 0 . . . 1 | This IE shall be present for roaming PDU sessions. When present, it shall indicate the associated visited SMF for home-routed the PDU Session, or the SMF for the local-breakout PDU session (regardless of whether an I-SMF is involved or not). | |
| vsmfSetId | NfSetId | C | 0 . . . 1 | This IE shall be present, if available. When present, this IE shall contain the NF Set ID of the V-SMF. | |
| ismfId | NfInstanceId | C | 0 . . . 1 | This IE shall be present if I-SMF is involved in the PDU session. When present, it shall indicate the associated I-SMF for the PDU Session. | DTSSA |
| ismfSetId | NfSetId | C | 0 . . . 1 | This IE shall be present, if available. When present, this IE shall contain the NF Set ID of the I-SMF. | DTSSA |

TABLE 2

| | 3GPP TS 29.502, Table 6.1.6.2.39-1: Definition of type SmContext | | | |
|---|---|---|---|---|
| Attribute name | Data type | P | Cardinality | Description |
| pduSessionId | PduSessionId | M | 1 | This IE shall contain the PDU Session ID. |
| dnn | Dnn | M | 1 | This IE shall contain the UE requested DNN of the PDU session. The DNN shall be the full DNN (i.e. with both the Network Identifier and Operator Identifier) for a HR PDU session, and it should be the full DNN in LBO and non-roaming scenarios. If the Operator Identifier is absent, the serving core network operator shall be assumed. |
| selectedDnn | Dnn | C | 0 . . . 1 | This IE shall be present, if another DNN other than the UE requested DNN is selected for this PDU session. When present, it shall contain the selected DNN. The DNN shall be the full DNN (i.e. with both the Network Identifier and Operator Identifier) for a HR PDU session, and it should be the full DNN in LBO and non-roaming scenarios. If the Operator Identifier is absent, the serving core network operator shall be assumed. |
| sNssai | Snssai | M | 1 | This IE shall contain the S-NSSAI for the serving PLMN. |
| hSmfUri | Uri | C | 0 . . . 1 | This IE shall be present in HR roaming scenarios. When present, it shall contain the API URI of the Nsmf_PDUSession service of the H-SMF. The API URI shall be formatted as specified in clause 6.1.1. |
| smfUri | Uri | C | 0 . . . 1 | This IE shall be present for a PDU session with an I-SMF. When present, it shall contain the API URI of the Nsmf_PDUSession service of the SMF. The API URI shall be formatted as specified in clause 6.1.1. |
| pduSessionRef | Uri | C | 0 . . . 1 | This IE shall be present for a HR PDU session or a PDU session with an I-SMF. When present, this IE shall include the absolute URI of the PDU Session in H-SMF or SMF, including apiRoot (see clause 6.1.3.6.2) |
| hSmfInstanceId | NfInstanceId | C | 0 . . . 1 | This IE shall be present for a HR PDU session. When present, it shall contain the identifier of the home SMF. |
| smfInstanceId | NfInstanceId | C | 0 . . . 1 | This IE shall be present for a PDU session with an I-SMF. When present, it shall contain the identifier of the SMF. |
| pduSessionSmfSetId | NfSetId | C | 0 . . . 1 | This IE shall be present, if available. When present, this IE shall contain the NF Set ID of the home SMF as identified by hSmfInstanceId, or the SMF as identified by the smfInstanceId. |
| pduSessionSmfServiceSetId | NfServiceSetId | C | 0 . . . 1 | This IE shall be present, if available. When present, this IE shall contain the NF Service Set ID of the PDUSession service instance (for this PDU session) in the home SMF or the SMF. |
| hSmfServiceInstanceId | string | O | 0 . . . 1 | This IE may be present for a HR PDU session. When present, this IE shall contain the serviceInstanceId of the H-SMF service instance serving the PDU session. This IE may be used by the V-SMF to identify PDU sessions affected by a failure or restart of the H-SMF service (see clause 6.2 of 3GPP TS 23.527 [24]). |
| smfServiceInstanceId | string | O | 0 . . . 1 | This IE may be present for a PDU session with an I-SMF. When present, this IE shall contain the serviceInstanceId of the SMF service instance serving the PDU session. This IE may be used by the I-SMF to identify PDU sessions affected by a failure or restart of the SMF service (see clause 6.2 of 3GPP TS 23.527 [24]). |
| . . . | . . . | | | |

According to a first aspect of the invention, there is provided an apparatus comprising:
one or more processors, and memory storing instructions that, when executed by the one or more processors, cause the apparatus to perform:
monitoring whether a consumer belonging to a target network receives a specific identifier of a resource, a first apiRoot identifying a producer, and a second apiRoot identifying the producer and a producer network; wherein
the first apiRoot is suitable for routing a first service request within the producer network to the producer,
the second apiRoot is suitable for routing a second service request from the target network to the producer in the producer network if the target network is different from the producer network;
the first apiRoot is different from the second apiRoot;
the first service request requests a service related to the resource;
the second service request requests the service related to the resource; and
the instructions, when executed by the one or more processors, further cause the apparatus to perform:
identifying the producer network based on the second apiRoot if the consumer receives the specific identifier, the first apiRoot, and the second apiRoot;
deciding whether the target network is different from the producer network;
if the target network is not different from the producer network: sending the first service request, wherein, in the first service request, the resource is identified by the first apiRoot and the specific identifier;
if the target network is different from the producer network: sending the second service request, wherein, in the second service request, the resource is identified by the second apiRoot and the specific identifier.

The sending of the one of the first service request and the second service request may comprise:
requesting a network function belonging to the target network to create a context related to the resource.

The request to the network function may comprise additionally the other one of the first apiRoot and the second apiRoot.

The sending of the one of the first service request and the second service request may comprise:
requesting the producer to update a context of the resource such that the resource is handled by the consumer.

The instructions, when executed by the one or more processors, may further cause the apparatus to perform:
supervising whether the consumer retrieves a context of a second resource from an intermediate network function, wherein
the monitoring whether the consumer receives the identifier of the first resource, the first apiRoot, and the second apiRoot may comprise monitoring whether the consumer receives the identifier of the first resource, the first apiRoot, and the second apiRoot in response to the retrieving of the context of the second resource.

The instructions, when executed by the one or more processors, may further cause the apparatus to perform:
monitoring whether an intermediate function belonging to a source network receives, in response to a request to create the resource in the producer, a first specific identifier of the resource, the first apiRoot, and the second apiRoot;
creating a context related to the resource in the intermediate function, wherein the context is identified within the intermediate function by a second specific identifier; and,
providing, in a response to a request for the resource received from the consumer, the second specific identifier, a third apiRoot, and a fourth apiRoot, wherein
the third apiRoot may comprise an identifier of the intermediate function and may be suitable for routing the first service request within the source network to the intermediate function;
the fourth apiRoot may comprise the identifier of the intermediate function and may be suitable for routing the second service request from the target network to the intermediate function in the source network;
the third apiRoot may be different from the fourth apiRoot; and within the intermediate function:
the second specific identifier may be unambiguously related to the first specific identifier;
the first apiRoot and second apiRoot may be unambiguously related to the third apiRoot and fourth apiRoot.

The instructions, when executed by the one or more processors, may further cause the apparatus to perform:
monitoring whether the intermediate function receives a request to retrieve the context of the resource, wherein the request may comprise the second specific identifier and the fourth apiRoot; and
the instructions, when executed by the one or more processors, may further cause the apparatus to perform:
deriving the first specific identifier, first apiRoot, and second apiRoot based on the second specific identifier;
providing, in response to the request, the first specific identifier, the first apiRoot, and the second apiRoot.

The resource may be for a terminal, and the terminal has moved from a source network to the target network.

According to a second aspect of the invention, there is provided an apparatus comprising:
one or more processors, and memory storing instructions that, when executed by the one or more processors, cause the apparatus to perform:
monitoring whether a consumer belonging to a target network receives a specific identifier of a first resource and a single one of a first apiRoot of a first producer and a second apiRoot of the first producer, wherein
the first apiRoot of the first producer identifies the first producer and is suitable for routing a first service request within a first producer network to the first producer,
the second apiRoot of the first producer identifies the first producer, comprises an identification of the first producer network, and is suitable for routing a second service request from the target network to the first producer in the first producer network if the target network is different from the first producer network;
the first apiRoot of the first producer is different from the second apiRoot of the first producer;
the first service request requests a first service related to the first resource;
the second service request requests the first service related to the first resource;
a network function profile of the first producer comprises the identification of the first producer network and information allowing to construct the first apiRoot of the first producer and the second apiRoot of the first producer; and the instructions, when executed by the one or more processors, further cause the apparatus to perform:
identifying a first repository function storing the network function profile of the first producer if the consumer receives the specific identifier of the first resource, and the single one of the first apiRoot of the first producer and the second apiRoot of the first producer;
inquiring the first repository function for the network function profile of the first producer;
deciding if the target network is different from the first producer network;
if the target network is different from the first producer network and the consumer receives the first apiRoot of the first producer:
  constructing the second apiRoot of the first producer based on the network function profile of the first producer; and
  sending the second service request, wherein, in the second service request, the first resource is identified by the second apiRoot of the first producer and the specific identifier of the first resource;
if the target network is not different from the first producer network and the consumer receives the second apiRoot of the first producer:
  constructing the first apiRoot of the first producer based on the network function profile of the first producer; and
  sending the first service request, wherein, in the first service request, the first resource is identified by the first apiRoot of the first producer and the specific identifier of the first resource.

The monitoring may comprise monitoring whether the consumer receives a request to create a context associated to the first resource, wherein
the request may comprise the specific identifier of the first resource and the single one of the first apiRoot of the first producer and the second apiRoot of the first producer; and
the sending of the one of the first service request and the second service request to the first producer may comprise retrieving a context associated to the first resource.

The instructions, when executed by the one or more processors, may further cause the apparatus to perform:
monitoring whether the consumer receives, in response to the retrieving, a specific identifier of a second resource and a single one of a first apiRoot of a second producer and a second apiRoot of the second producer, wherein
the first apiRoot of the second producer may identify the second producer and may be suitable for routing a third service request within a second producer network to the second producer,
the second apiRoot of the second producer may identify the second producer, may comprise an identification of the second producer network, and may be suitable for routing a fourth service request from the target network to the second producer in the second producer network if the target network is different from the second producer network;
the first apiRoot of the second producer may be different from the second apiRoot of the second producer;
the third service request may request a second service related to the first resource;
the fourth service request may request the second service related to the first resource;
a network function profile of the second producer may comprise the identification of the second producer network and information allowing to construct the first apiRoot of the second producer and the second apiRoot of the second producer; and the instructions, when executed by the one or more processors, may further cause the apparatus to perform:
identifying a second repository function storing the network function profile of the second producer if the consumer receives the specific identifier of the second resource and the single one of the first apiRoot of the second producer and the second apiRoot of the second producer;
inquiring the second repository function for the network function profile of the second producer;
deciding if the target network is different from the second producer network;
if the target network is different from the second producer network and the consumer receives the first apiRoot of the second producer:
  constructing the second apiRoot of the second producer based on the network function profile of the second producer; and
  sending the second service request requesting an update of the second resource, wherein, in the second update request, the second resource may be identified by the second apiRoot of the second producer and the specific identifier of the second resource;
if the target network is not different from the second producer network and the consumer receives the second apiRoot of the second producer:
  constructing the first apiRoot of the second producer based on the network function profile of the second producer; and
  sending the first service request requesting the update of the second resource, wherein, in the first service request the second resource may be identified by the first apiRoot of the second producer and the specific identifier of the second resource.

The first resource may be for a terminal, and the terminal has moved from a source network to the target network.

According to a third aspect of the invention, there is provided an apparatus comprising:
one or more processors, and memory storing instructions that, when executed by the one or more processors, cause the apparatus to perform:
monitoring whether a producer belonging to a producer network produced a resource due to a received request to produce the resource;
providing a response to the received request that the resource is produced if the resource is produced, wherein
the response comprises a specific identifier of the resource, a first apiRoot, and a second apiRoot,
the first apiRoot is suitable for routing a first service request within the producer network to the producer,
the second apiRoot is suitable for routing a second service request from a target network different from the producer network to the producer in the producer network;
the first apiRoot is different from the second apiRoot;
the first service request requests a service related to the resource;
the second service request requests the service related to the resource.

According to a fourth aspect of the invention, there is provided an apparatus comprising:
one or more processors, and memory storing instructions that, when executed by the one or more processors, cause the apparatus to perform:

monitoring whether a response to a request from a source network function belonging to a source network to a producer belonging to a producer network to produce a resource comprises a specific identifier of the resource, a first apiRoot, and a second apiRoot, providing the specific identifier, the first apiRoot, and the second apiRoot to a consumer belonging to a target network if the response comprises the specific identifier of the resource, the first apiRoot, and the second apiRoot; wherein the first apiRoot is suitable for routing a first service request within the producer network to the producer, the second apiRoot is suitable for routing a second service request from the target network to the producer in the producer network if the target network is different from the producer network;

the first apiRoot is different from the second apiRoot;

the first service request requests a service related to the resource;

the second service request requests the service related to the resource.

According to a fifth aspect of the invention, there is provided an apparatus comprising:

one or more processors, and memory storing instructions that, when executed by the one or more processors, cause the apparatus to perform:

monitoring whether a response to a request from a source network function belonging to a source network to a producer belonging to a producer network to produce a resource comprises a specific identifier of the resource, a first apiRoot, and a second apiRoot, identifying the producer network based on the second apiRoot if the response comprises the specific identifier of the resource, the first apiRoot, and the second apiRoot;

deciding whether a target network is different from the producer network;

if the target network is not different from the producer network: providing the specific identifier and the first apiRoot but not the second apiRoot to a consumer belonging to the target network;

if the target network is different from the producer network: providing the specific identifier and the second apiRoot but not the first apiRoot to the consumer belonging to the target network; wherein the first apiRoot is suitable for routing a first service request within the producer network to the producer, the second apiRoot is suitable for routing a second service request from the target network to the producer in the producer network if the target network is different from the producer network;

the first apiRoot is different from the second apiRoot;

the first service request requests a service related to the resource;

the second service request requests the service related to the resource.

According to the fourth and fifth aspects, the resource may be for a terminal, and the terminal has moved from the source network to the target network.

According to any of the first to fifth aspects:

the first apiRoot may comprise an identifier of the one of the producer, the first producer, and the second producer, respectively, and may not comprise at least one of a network code of the one of the producer network, the first producer network, and the second producer network, respectively, and a country code of the one of the producer network, the first producer network, and the second producer network, respectively, the second apiRoot may comprise the identifier of the one of the producer, the first producer, and the second producer, respectively, the network code of the one of the producer network, the first producer network, and the second producer network, respectively, and the country code of the one of the producer network, the first producer network, and the second producer network, respectively;

the identifier of the one of the producer, the first producer, and the second producer, respectively, may not comprise the network code of the one of the producer network, the first producer network, and the second producer network, respectively, and the country code of the one of the producer network, the first producer network, and the second producer network, respectively.

According to any of the first to fifth aspects, the first apiRoot may comprise an identification of the one of the producer network, first producer network, and second producer network, respectively.

According to any of the first to fifth aspects, at least one of:

at least one of the producer, the first producer, and the second producer, respectively, may correspond to one of: a session management function and a policy control function;

the consumer may correspond to one of: an access and mobility management function, a session management function, and a policy control function;

at least one of the resource, the first resource, and second resource, respectively, may correspond to one of: a session management context, a packet data unit session context, and a policy control function.

According to a sixth aspect of the invention, there is provided a method comprising:

monitoring whether a consumer belonging to a target network receives a specific identifier of a resource, a first apiRoot identifying a producer, and a second apiRoot identifying the producer and a producer network; wherein the first apiRoot is suitable for routing a first service request within the producer network to the producer, the second apiRoot is suitable for routing a second service request from the target network to the producer in the producer network if the target network is different from the producer network;

the first apiRoot is different from the second apiRoot;

the first service request requests a service related to the resource;

the second service request requests the service related to the resource; and the method may further comprise:

identifying the producer network based on the second apiRoot if the consumer receives the specific identifier, the first apiRoot, and the second apiRoot;

deciding whether the target network is different from the producer network;

if the target network is not different from the producer network: sending the first service request, wherein, in the first service request, the resource is identified by the first apiRoot and the specific identifier;

if the target network is different from the producer network: sending the second service request, wherein, in the second service request, the resource is identified by the second apiRoot and the specific identifier.

The sending of the one of the first service request and the second service request may comprise:
  requesting a network function belonging to the target network to create a context related to the resource.
The request to the network function may comprise additionally the other one of the first apiRoot and the second apiRoot.
The sending of the one of the first service request and the second service request may comprise:
  requesting the producer to update a context of the resource such that the resource is handled by the consumer.
The method may further comprise:
  supervising whether the consumer retrieves a context of a second resource from an intermediate network function, wherein
  the monitoring whether the consumer receives the identifier of the first resource, the first apiRoot, and the second apiRoot may comprise monitoring whether the consumer receives the identifier of the first resource, the first apiRoot, and the second apiRoot in response to the retrieving of the context of the second resource.
The method may further comprise:
  monitoring whether an intermediate function belonging to a source network receives, in response to a request to create the resource in the producer, a first specific identifier of the resource, the first apiRoot, and the second apiRoot;
  creating a context related to the resource in the intermediate function, wherein the context is identified within the intermediate function by a second specific identifier; and,
  providing, in a response to a request for the resource received from the consumer, the second specific identifier, a third apiRoot, and a fourth apiRoot, wherein
  the third apiRoot may comprise an identifier of the intermediate function and may be suitable for routing the first service request within the source network to the intermediate function;
  the fourth apiRoot may comprise the identifier of the intermediate function and may be suitable for routing the second service request from the target network to the intermediate function in the source network;
  the third apiRoot may be different from the fourth apiRoot; and
  within the intermediate function:
    the second specific identifier may be unambiguously related to the first specific identifier;
    the first apiRoot and second apiRoot may be unambiguously related to the third apiRoot and fourth apiRoot.
The method may further comprise:
  monitoring whether the intermediate function receives a request to retrieve the context of the resource, wherein the request may comprise the second specific identifier and the fourth apiRoot; and
  the method may further comprise:
  deriving the first specific identifier, first apiRoot, and second apiRoot based on the second specific identifier;
  providing, in response to the request, the first specific identifier, the first apiRoot, and the second apiRoot.
The resource may be for a terminal, and the terminal has moved from a source network to the target network.
According to a seventh aspect of the invention, there is provided a method comprising:
  monitoring whether a consumer belonging to a target network receives a specific identifier of a first resource and a single one of a first apiRoot of a first producer and a second apiRoot of the first producer, wherein
  the first apiRoot of the first producer identifies the first producer and is suitable for routing a first service request within a first producer network to the first producer,
  the second apiRoot of the first producer identifies the first producer, comprises an identification of the first producer network, and is suitable for routing a second service request from the target network to the first producer in the first producer network if the target network is different from the first producer network;
  the first apiRoot of the first producer is different from the second apiRoot of the first producer;
  the first service request requests a first service related to the first resource;
  the second service request requests the first service related to the first resource;
  a network function profile of the first producer comprises the identification of the first producer network and information allowing to construct the first apiRoot of the first producer and the second apiRoot of the first producer; and
  the method may further comprise:
  identifying a first repository function storing the network function profile of the first producer if the consumer receives the specific identifier of the first resource, and the single one of the first apiRoot of the first producer and the second apiRoot of the first producer;
  inquiring the first repository function for the network function profile of the first producer;
  deciding if the target network is different from the first producer network;
  if the target network is different from the first producer network and the consumer receives the first apiRoot of the first producer:
    constructing the second apiRoot of the first producer based on the network function profile of the first producer; and
    sending the second service request, wherein, in the second service request, the first resource is identified by the second apiRoot of the first producer and the specific identifier of the first resource;
  if the target network is not different from the first producer network and the consumer receives the second apiRoot of the first producer:
    constructing the first apiRoot of the first producer based on the network function profile of the first producer; and
    sending the first service request, wherein, in the first service request, the first resource is identified by the first apiRoot of the first producer and the specific identifier of the first resource.
The monitoring may comprise monitoring whether the consumer receives a request to create a context associated to the first resource, wherein
  the request may comprise the specific identifier of the first resource and the single one of the first apiRoot of the first producer and the second apiRoot of the first producer; and
  the sending of the one of the first service request and the second service request to the first producer may comprise retrieving a context associated to the first resource.
The method may further comprise:
  monitoring whether the consumer receives, in response to the retrieving, a specific identifier of a second resource and a single one of a first apiRoot of a second producer and a second apiRoot of the second producer, wherein the first apiRoot of the second producer may identify the second producer and may be suitable for routing a third service request within a second producer network to the second producer, the second apiRoot of the second producer may identify the second producer, may comprise an identification of the second producer network, and may be suitable for routing a fourth service request from the target network to the second producer in the second producer network if the target network is different from the second producer network;

the first apiRoot of the second producer may be different from the second apiRoot of the second producer;

the third service request may request a second service related to the first resource;

the fourth service request may request the second service related to the first resource;

a network function profile of the second producer may comprise the identification of the second producer network and information allowing to construct the first apiRoot of the second producer and the second apiRoot of the second producer; and the method may further comprise:

identifying a second repository function storing the network function profile of the second producer if the consumer receives the specific identifier of the second resource and the single one of the first apiRoot of the second producer and the second apiRoot of the second producer;

inquiring the second repository function for the network function profile of the second producer;

deciding if the target network is different from the second producer network;

if the target network is different from the second producer network and the consumer receives the first apiRoot of the second producer:
  constructing the second apiRoot of the second producer based on the network function profile of the second producer; and
  sending the second service request requesting an update of the second resource, wherein, in the second update request, the second resource may be identified by the second apiRoot of the second producer and the specific identifier of the second resource;

if the target network is not different from the second producer network and the consumer receives the second apiRoot of the second producer:
  constructing the first apiRoot of the second producer based on the network function profile of the second producer; and
  sending the first service request requesting the update of the second resource, wherein, in the first service request the second resource may be identified by the first apiRoot of the second producer and the specific identifier of the second resource.

The first resource may be for a terminal, and the terminal has moved from a source network to the target network.

According to an eighth third aspect of the invention, there is provided a method comprising:

monitoring whether a producer belonging to a producer network produced a resource due to a received request to produce the resource;

providing a response to the received request that the resource is produced if the resource is produced, wherein the response comprises a specific identifier of the resource, a first apiRoot, and a second apiRoot, the first apiRoot is suitable for routing a first service request within the producer network to the producer, the second apiRoot is suitable for routing a second service request from a target network different from the producer network to the producer in the producer network;

the first apiRoot is different from the second apiRoot;

the first service request requests a service related to the resource;

the second service request requests the service related to the resource.

According to a ninth aspect of the invention, there is provided a method comprising:

monitoring whether a response to a request from a source network function belonging to a source network to a producer belonging to a producer network to produce a resource comprises a specific identifier of the resource, a first apiRoot, and a second apiRoot, providing the specific identifier, the first apiRoot, and the second apiRoot to a consumer belonging to a target network if the response comprises the specific identifier of the resource, the first apiRoot, and the second apiRoot; wherein the first apiRoot is suitable for routing a first service request within the producer network to the producer, the second apiRoot is suitable for routing a second service request from the target network to the producer in the producer network if the target network is different from the producer network;

the first apiRoot is different from the second apiRoot;

the first service request requests a service related to the resource;

the second service request requests the service related to the resource.

According to a tenth aspect of the invention, there is provided a method comprising:

monitoring whether a response to a request from a source network function belonging to a source network to a producer belonging to a producer network to produce a resource comprises a specific identifier of the resource, a first apiRoot, and a second apiRoot, identifying the producer network based on the second apiRoot if the response comprises the specific identifier of the resource, the first apiRoot, and the second apiRoot;

deciding whether a target network is different from the producer network;

if the target network is not different from the producer network: providing the specific identifier and the first apiRoot but not the second apiRoot to a consumer belonging to the target network;

if the target network is different from the producer network: providing the specific identifier and the second apiRoot but not the first apiRoot to the consumer belonging to the target network; wherein the first apiRoot is suitable for routing a first service request within the producer network to the producer, the second apiRoot is suitable for routing a second service request from the target network to the producer in the producer network if the target network is different from the producer network;

the first apiRoot is different from the second apiRoot;

the first service request requests a service related to the resource;

the second service request requests the service related to the resource.

According to the ninth and tenth aspects, the resource may be for a terminal, and the terminal has moved from the source network to the target network.

According to any of the sixth to tenth aspects:
the first apiRoot may comprise an identifier of the one of the producer, the first producer, and the second producer, respectively, and may not comprise at least one of a network code of the one of the producer network, the first producer network, and the second producer network, respectively, and a country code of the one of the producer network, the first producer network, and the second producer network, respectively, the second apiRoot may comprise the identifier of the one of the producer, the first producer, and the second producer, respectively, the network code of the one of the producer network, the first producer network, and the second producer network, respectively, and the country code of the one of the producer network, the first producer network, and the second producer network, respectively;

the identifier of the one of the producer, the first producer, and the second producer, respectively, may not comprise the network code of the one of the producer network, the first producer network, and the second producer network, respectively, and the country code of the one of the producer network, the first producer network, and the second producer network, respectively.

According to any of the sixth to tenth aspects, the first apiRoot may comprise an identification of the one of the producer network, first producer network, and second producer network, respectively.

According to any of the sixth to tenth aspects, at least one of:
at least one of the producer, the first producer, and the second producer, respectively, may correspond to one of: a session management function and a policy control function;
the consumer may correspond to one of: an access and mobility management function, a session management function, and a policy control function;
at least one of the resource, the first resource, and second resource, respectively, may correspond to one of: a session management context, a packet data unit session context, and a policy control function.

Each of the methods of the sixth to tenth aspects may be a method of inter-PLMN mobility.

According to an eleventh aspect of the invention, there is provided a computer program product comprising a set of instructions which, when executed on an apparatus, is configured to cause the apparatus to carry out the method according to any of the sixth to tenth aspects. The computer program product may be embodied as a computer readable medium or directly loadable into a computer.

According to some embodiments of the invention, at least one of the following advantages may be achieved:
successful resource transfer and seamless services in case of mobility between networks even if different URIs are used to address the resource, e.g. seamless mobility of a PDU session between VPLMN and HPLMN even if an inter-PLMN and an intra-PLMN URI, respectively, are used to address the PDU session resource in the (anchor) SMF;
backwards compatibility is ensured.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 6 shows an apparatus according to an example embodiment of the invention;

FIG. 7 shows a method according to an example embodiment of the invention;

FIG. 8 shows an apparatus according to an example embodiment of the invention;

FIG. 9 shows a method according to an example embodiment of the invention;

FIG. 10 shows an apparatus according to an example embodiment of the invention;

FIG. 11 shows a method according to an example embodiment of the invention;

FIG. 12 shows an apparatus according to an example embodiment of the invention:

FIG. 13 shows a method according to an example embodiment of the invention;

FIG. 14 shows an apparatus according to an example embodiment of the invention;

FIG. 15 shows a method according to an example embodiment of the invention; and

FIG. 16 shows an apparatus according to an example embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

When the UE moves between its Home PLMN (HPLMN) and a Visited PLMN (VPLMN), the target AMF (T-AMF) in the target PLMN receives resource URIs (e.g. for the PDU sessions of the UE being transferred from the source PLMN) as if they had been received by the source AMF (S-AMF) in the source PLMN. This can result in the target PLMN being unable to reach the NFp because it receives URIs with a format that does not comply with 3GPP requirements and that does not allow the routing of signaling towards the NFp. Example Use Cases:

1) UE Mobility from HPLMN to VPLMN
   UE establishes a PDU Session in its HPLMN. When the AMF discovers the SMF, the NRF provides an IP address for the SMF since the UE is non-roaming. NRF could also have chosen to provide an fqdn in a non-roaming format. The SMF returns a PDU session URI with an intra-PLMN apiRoot (e.g. http://10.122.47.65:65419/nsmf-pdusession/v1/sm-contexts/000d0100 or http://smf123.operator.com/nsmf-pdusession/v1/sm-contexts/000d0100
   UE moves to VPLMN (irrespective of the mode, e.g. idle mode mobility or connected mode mobility)
   S-AMF (from HPLMN) provides T-AMF (from VPLMN) with the Session Management (SM) context for the PDU Session which includes the smContextRef (i.e. the above PDU session URI) of the Home (anchor) SMF.
   T-AMF inserts a V-SMF and passes the received hSMF smContextRef to the V-SMF (such as to allow the V-SMF to retrieve the SM context from the H-SMF). However, since the smContextRef is not in an inter-plmn fqdn format, the V-SMF cannot retrieve the SM context from the H-SMF. Accordingly, the PDU session mobility to the target PLMN fails.

Figure 1A:
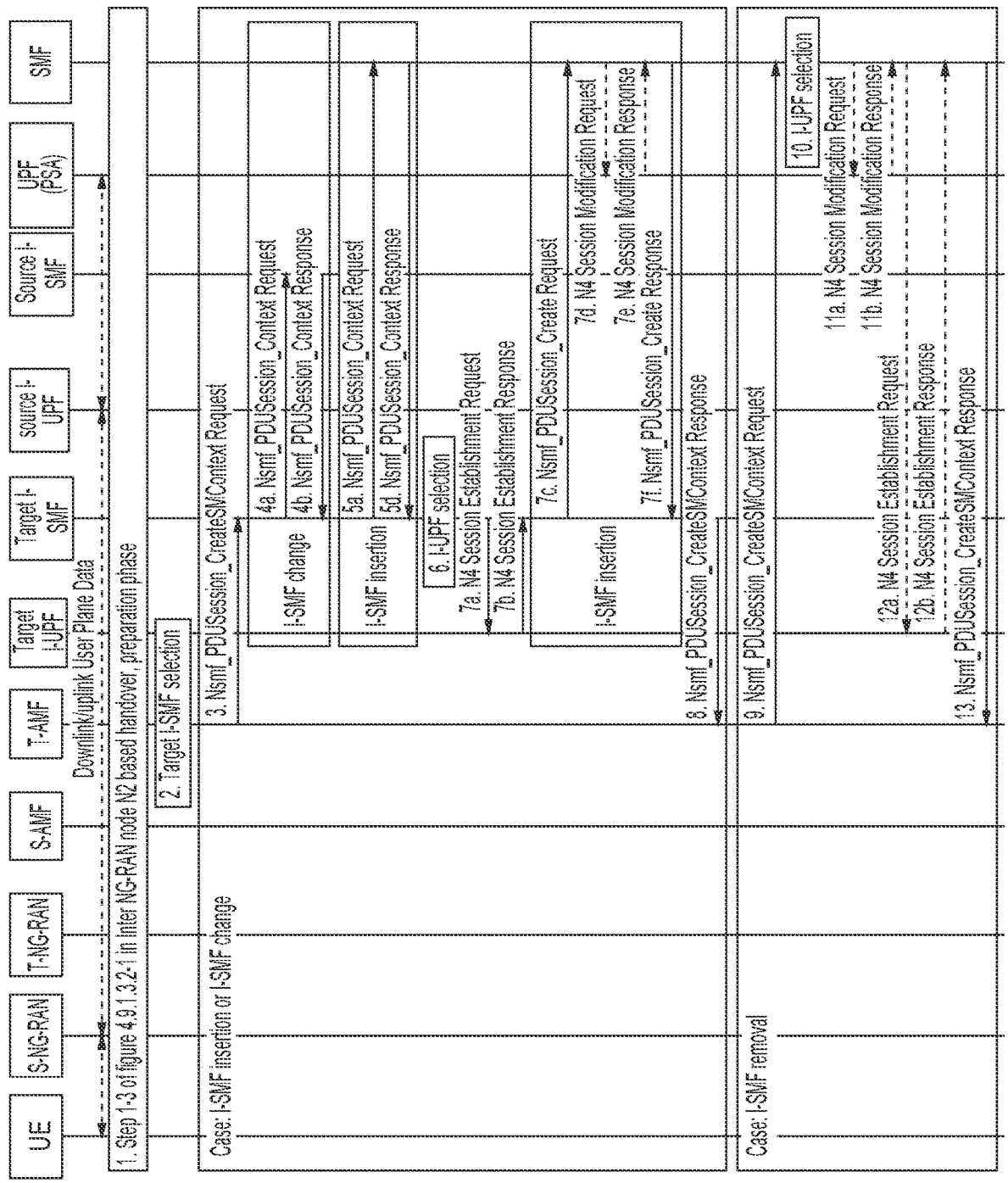
FIG. 1 (comprising FIGS. 1A and 1B) shows a message sequence chart for an inter-PLMN handover according to 3GPP TS 23.502, FIG. 4.23.7.3.2-1.
Figure 4:
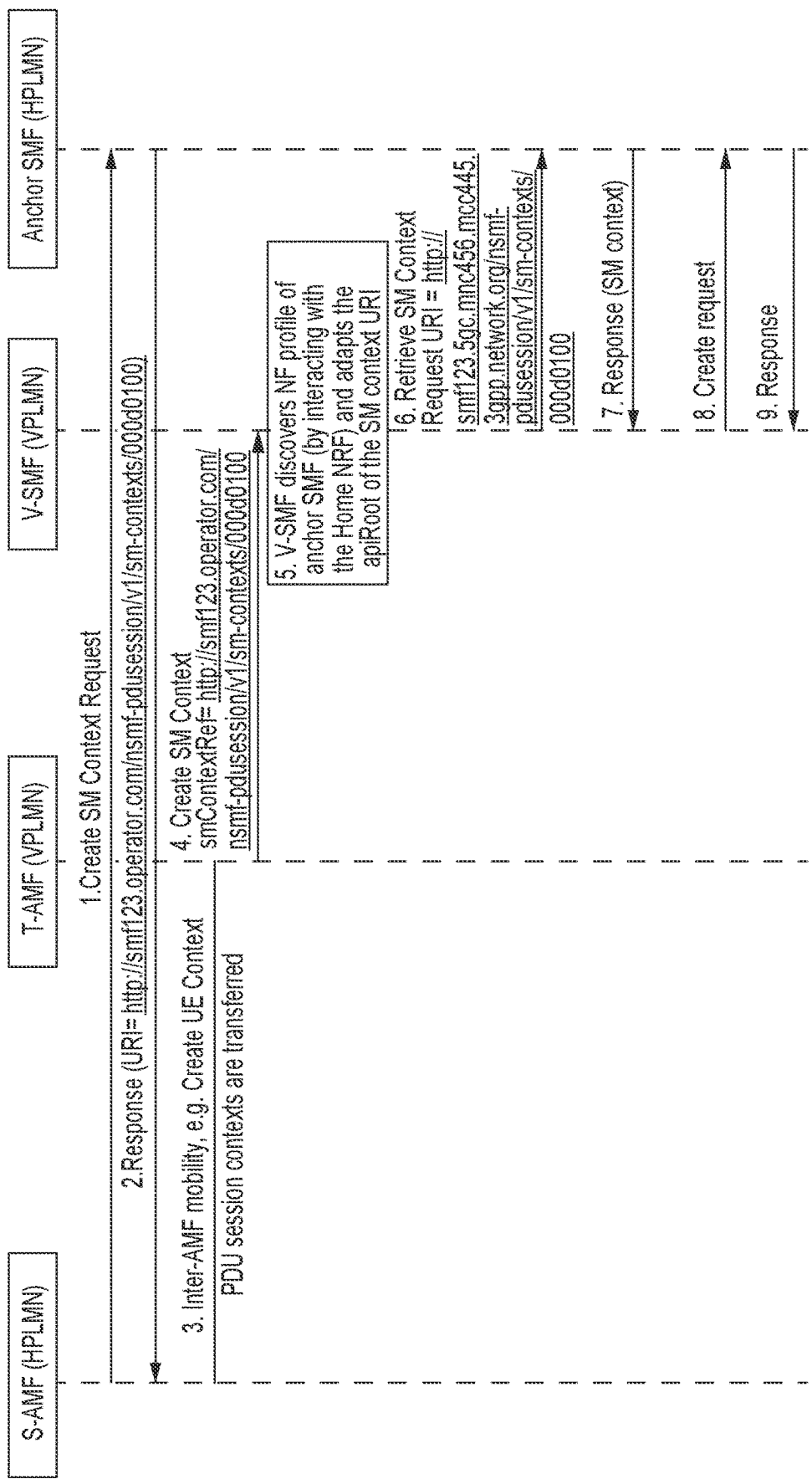
FIG. 4 shows a message sequence chart of an inter-PLMN mobility according to some example embodiments of the invention.

Taking the example of an inter-PLMN handover, the I-SMF is to be substituted by the V-SMF in the call flow of FIG. 1 (FIG. 4.23.7.3.2-1 of 3GPP TS 23.502). IN the call flow of FIG. 1, for the above described example use case 1), the following issues arise:
   a) Assuming there is no I-SMF in the HPLMN (source PLMN), the target AMF (T-AMF) needs to insert a V-SMF. In action 3, the T-AMF sends the smContextRef received from the source AMF (S-AMF) to the V-SMF (e.g. http://10.122.47.65:65419/nsmf-pdusession/v1/sm-contexts/000d0100). But the V-SMF cannot proceed with action 5a since action 5a requires the V-SMF to use an URI formatted for inter-PLMN signalling. So the procedure fails.
   b) Assuming there is an I-SMF in the HPLMN (source PLMN), the target AMF (T-AMF) needs to insert a V-SMF (this is handled here as for the "I-SMF change scenario"). In action 3, the T-AMF sends the smContextRef received from the source AMF (S-AMF) to the V-SMF (e.g. http://10.122.47.65:65419/nsmf-pdusession/v1/sm-contexts/000d0100). But the V-SMF cannot proceed with action 4a since action 4a requires the V-SMF to use an URI formatted for inter-PLMN signalling. Additionally, a second problem is that even if action 4a could be done somehow, the V-SMF could not proceed either with action 17 since the SM Context that would be retrieved from the source I-SMF would only contain the H-SMF PDU session reference (i.e. URI) with an intra-PLMN format. So the procedure fails.

2) UE Mobility from VPLMN to HPLMN
   During UE mobility from VPLMN to HPLMN, the T-AMF either inserts an I-SMF (replacing the V-SMF in the source PLMN) or sends a Create SM Context to the anchor SMF (removing the V-SMF from the source PLMN). In the former case, the new I-SMF needs to retrieve the SM context from the V-SMF in the source PLMN (action 4a of FIG. 1). In either case, the anchor SMF invokes Nsmf_PDUSession_UpdateSMContext Request to the source V-SMF in order to establish the indirect forwarding tunnel (action 27 of FIG. 1) (the SMF uses the SM Context ID received from T-AMF for this service operation).
   The S-AMF in the Source PLMN may have received an SM context reference from the V-SMF with an intra-PLMN URI. However, to be able to retrieve the SM context from the V-SMF or setup a forwarding tunnel, the new I-SMF or anchor SMF in the HPLMN needs to send a Retrieve SM Context Request or an Update SM Context Request to the old V-SMF with a request URI with an inter-PLMN format. This means that the procedure in action 4a or action 27 fails due to the smContextReference received from the S-AMF having an intra PLMN apiRoot.
   Note: Additionally, if no I-SMF needs to be inserted in the HPLMN, the T-AMF should send a Create SM Context request to the anchor SMF using an intra-PLMN format. This requires the T-AMF to do an NF Discovery Request to the NRF to retrieve the anchor SMF profile and gets in the response the intra-PLMN authority to use for contacting the anchor SMF.

3) Similar considerations apply to other use cases with an inter-PLMN mobility, when NFs in the target PLMN need to send requests targeting resources in the HPLMN. An example is the AMF interacting with the V-PCF or H-PCF for UE policy. During inter-AMF mobility, the S-AMF sends to the T-AMF the URI of the PCF for UE Policy, which may result in the same problem of the T-AMF receiving a URI that it cannot use to reach the PCF.

Some example embodiments of the invention enable an inter-PLMN mobility of a UE according to the following parts:
   1) An NFc in the target PLMN (e.g. AMF or V-/I-SMF) sends a service request targeting an existing resource of an NFp (e.g. a PDU session of an anchor SMF), using a request URI that the NFc constructs with an intra-PLMN or an inter-PLMN apiRoot, depending on whether the NFc is in the same or a different PLMN than the NFp, overwriting the apiRoot of the resource's URI it has received from the source PLMN. The NFc determines the intra-PLMN or inter-PLMN apiRoot to use for building the request URI using the principles of 2) or 3).
   2) An NFp signals an intra-PLMN and an inter-PLMN apiRoot of a resource URI, in response to a resource creation request in the source PLMN. In some example embodiments, NFp signals these apiRoots only when the resource may be accessed by NF service consumers in the HPLMN and VPLMN during the lifetime of the resource. The decision depends on operator policies. E.g., the SMF operator may allow or disallow the mobility of PDU sessions or certain PDU sessions (e.g. function of the network slice and Data Network Name) across PLMNs.
      The NFp may signal the intra-PLMN and inter-PLMN apiRoot to the NFc during the creation of the resource by signaling them in an HTTP custom header (e.g. extending the 3gpp-Sbi-Response-Info header) or in the JSON payload of the resource creation response.
      The NFc in the source PLMN stores the intra-PLMN and inter-PLMN root of the resource URI and transfers them to the target PLMN during inter-PLMN mobility.

3) An NFc (e.g. V/I-SMF) in the target PLMN sends an NF Discovery request to the NRF to discover the profile of the NFp. The NRF returns the NFp profile in the NF Discovery response, from which the NFc can build an intra-PLMN or inter-PLMN apiRoot for sending a request targeting the resource of the NFp.

For each inter-PLMN mobility of a UE, parts 2) and 3) are alternative approaches. Thus, some involved NFs may be configured to perform only one of part 2) and part 3). However, in some example embodiments, some or all of the involved network functions may be configured to perform each of parts 2) and 3), e.g. according to some criterion. For instance, if the target VPLMN does not receive the intra-PLMN and an inter-PLMN apiRoot of a resource URI during the inter-PLMN mobility scenario (due to e.g. the source PLMN not supporting corresponding protocol extensions), the target PLMN may proceed with the part 3) to discover and construct a suitable apiRoot for sending a request targeting the resource of the NFp. For example, each involved NF may perform a respective one of these parts 2) and 3) as a default, but if one of the involved NFs does not support the default part of another involved NF, the other part may be chosen. The NFs may inform each other about their respective capability by signalling.

Hereinafter, parts 1) to 3) are described at greater detail.

Part 1):

An NFc in the target PLMN (e.g. AMF or V-/I-SMF) sends a service request targeting an existing resource of an NFp (e.g. a PDU session of an anchor SMF), using a request URI that the NFc constructs with an intra-PLMN or an inter-PLMN apiRoot, depending on whether the NFc is in the same or a different PLMN than the NFp.

The invention enables for instance (taking the example use cases of depicted in FIGS. 2 and 3, respectively):

the T-AMF in the target PLMN to send SM context service requests (e.g. Update SM context request, Release SM context request defined in 3GPP TS 29.502) towards the SMF with a Request URI including an intra-PLMN or an inter-PLMN apiRoot, if the T-AMF is in the same or a different PLMN than the anchor SMF.

the I-SMF or V-SMF in the target PLMN to send PDU session service requests (e.g. Update request, Release request, Retrieve SM Context defined in 3GPP TS 29.502) towards the anchor SMF with a Request URI including an intra-PLMN or an inter-PLMN apiRoot, if the I-SMF or V-SMF is in the same or a different PLMN than the anchor SMF.

the I-SMF or V-SMF in the target PLMN to send SM context service requests (e.g. Retrieve SM Context defined in 3GPP TS 29.502) towards an old I-SMF or V-SMF in the source PLMN with a Request URI including an inter-PLMN apiRoot.

The NFc in the target PLMN overwrites the apiRoot of the Resource URI it has received from the source PLMN, if necessary. For instance, if the Resource URI of an SM context received from the source AMF contains an intra-PLMN apiRoot, and the NFc is not in the same PLMN as the anchor SMF, the NFc overwrites the apiRoot of the resource URI with the inter-PLMN apiRoot. As another example, if the Resource URI of an SM context received from the source AMF contains an inter-PLMN apiRoot, and the NFc is in the same PLMN as the anchor SMF, the NFc overwrites the apiRoot of the resource URI with the intra-PLMN apiRoot. See further details in 2) and 3) below.

The NFc determines the intra-PLMN or inter-PLMN apiRoot to use for building the request URI using the principles of 2) or 3).

Part 2):

An NFp signals an intra-PLMN and an inter-PLMN apiRoot of a resource URI, in response to a resource creation request. In some example embodiments, NFp signals these apiRoots only when the resource may be accessed by NF service consumers in the HPLMN and VPLMN during the lifetime of the resource.

The NFp may signal the intra-PLMN and inter-PLMN apiRoot to the NFc during the creation of the resource by signaling them in an HTTP custom header (e.g. extending the 3gpp-Sbi-Response-Info header) and/or in the JSON payload of the resource creation response. These options are described as Option 2A and Option 2B further below. The options may be combined.

Option 2A: NFp provides intra-PMN and inter-PLMN apiRoot (or URIs) in an HTTP custom header The intra-PLMN and inter-PLMN apiRoot are signalled within an HTTP header that is returned in the resource creation response (i.e. HTTP 201 Created response). The HTTP header may be a 3GPP custom header and could for instance correspond to the 3gpp-Sbi-Response-Info header defined in 3GPP TS 29.500, extended as indicated in bold:

The header contains a comma-delimited list of additional information related to an HTTP response. It may be included e.g. in a 4xx or 5xx response sent:

by an SCP to indicate whether it attempted to retransmit the request to alternative HTTP server instances; or by an alternative HTTP server instance to indicate whether the corresponding resource or context has been transferred to the alternative HTTP server instance, or by an HTTP server instance to indicate that the failed request shall not be retried.

The header may also be included in a 201 Created response sent by an NF service producer when the created resource may be accessed by NF service consumers in HPLMN and VPLMN during the lifetime of the resource.

The encoding of the header follows the ABNF as defined in IETF RFC 7230 [12]. 3gpp-Sbi-Response-Info= "3gpp-Sbi-Response-Info" ":" 1 #(OWS parameter [*(";" OWS parameter)])

parameter=parametername "=" RWS parametervalue parametername="request-retransmitted"/"nfinst"/"nfset"/ "nfservinst"/"nfserviceset"/"context-transferred"/"no-retry"/intraPlmnApiRoot/interPlmnApiRoot/token interPlmnApiRoot="intraPlmnApiRoot=" OWS scheme "://" authority [prefix]

interPlmnApiRoot="interPlmnApiRoot=" OWS scheme "://" authority [prefix]

scheme="http"/"https"

authority=host [":" port]

port=*DIGIT prefix=path-absolute; path-absolute production rule from IETF RFC 3986 [14], clause 3.3

Example: 201 Response with NFp sending an intra-PLMN apiRoot "https://smf123.operator.com" and an inter-PLMN apiRoot "https://smf123.5gc.mnc012.mcc345.3gppnetwork. org" in the header:

3gpp-Sbi-Response-Info: intraPlmnApiRoot=https %3A%2F%2Fsmf123.operator.com; interPlmnApi-Root= https %3A %2F %2Fsmf123.5gc.mnc012. mcc345.3gppnetwork.org Note that a 201 response already includes a Location header with the resource URI. So in a variant, the 3gpp-Sbi-Response-Info (or any other header used to signal the above extensions) may only include one of the intra-PLMN and inter-PLMN apiRoot, i.e. the format that is not already included in the Location header. Note also that in another variant, the 3gpp-Sbi-Response-Info (or any other header used to signal the above extensions) contains new inter-PlmnURI and intraPlmnURI, i.e. not only the apiRoot.

Option 2B: NFp provides intra-PMN and inter-PLMN apiRoot (or URIs) in the JSON payload of the resource creation response In this option, the SMF PDUSession API (defined in 3GPP TS 29.502) is extended such as to enable the SMF to return an inter-PLMN and an intra-PLMN apiRoot during the creation of an SM context or a PDU session, e.g. with extensions to 3GPP TS 29.502 (shown in bold in Tables 3 and 4):

TABLE 3

Definition of SmContextCreatedData (adaptation of Table 6.1.6.2.3-1 of 3GPP TS 29.502)

| Attribute name | Data type | P | Cardinality | Description | Applicability |
| --- | --- | --- | --- | --- | --- |
| hsmfUri | Uri | C | 0...1 | This IE shall be present in HR roaming scenarios if the additionalHsmfUri IE was received in the request and the V-SMF established the PDU session towards an alternative SMF listed in the additionalHsmfUri IE. When present, it shall contain the API URI of the H-SMF towards which the PDU session was established. The API URI shall be formatted as specified in clause 6.1.1. | |
| smfUri | Uri | C | 0...1 | This IE shall be present for a PDU session with an I-SMF, if the additionalSmfUri IE was received in the request and the I-SMF established the PDU session towards an alternative SMF listed in the additionalSmfUri IE. When present, it shall contain the API URI of the SMF towards which the PDU session was established. The API URI shall be formatted as specified in clause 6.1.1. | DTSSA |
| pduSessionId | PduSessionId | C | 0...1 | This IE shall be present, during an EPS to 5GS Idle mode mobility or handover using the N26 interface. When present, it shall be set to the PDU Session ID. | |
| ... | ... | | | | |
| selectedOldSmfId | NfInstanceId | C | 0...1 | This IE shall be present if another old I/V-SMF(as alternative to the old I/V-SMF) is selected, e.g. by the new I/V-SMF, anchor SMF or a SCP between the new I/V-SMF and the old I/V-SMF. (NOTE) When present, it shall contain the selected old I/V-SMF NF Instance Id. | DTSSA |
| interPlmnApiRootURI | | O | 0...1 | ApiRoot of the SM context URI to be used in inter-PLMN signalling targeting the SM context. (NOTE) | |
| intraPlmnApiRootURI | | O | 0...1 | ApiRoot of the SM context URI to be used in intra-PLMN signalling targeting the SM context. | |

NOTE:
The inter-PLMN apiRoot may be used for the retrieval of the SM context from an SMF from another PLMN or to establish data forwarding tunnels during an inter-PLMN mobility.

TABLE 4

Definition of type PduSessionCreatedData (adaptation of Table 6.1.6.2.10-1 of 3GPP TS 29.502)

| Attribute name | Data type | P | Cardinality | Description | Applicability |
| --- | --- | --- | --- | --- | --- |
| pduSessionType | PduSessionType | M | 1 | This IE shall indicate the selected PDU type. | |
| hSmfInstanceId | NfInstanceId | C | 0...1 | This IE shall be present for a HR PDU session. When present, it shall contain the identifier of the home SMF. | |
| smfInstanceId | NfInstanceId | C | 0...1 | This IE shall be present for a PDU session with an I-SMF. When present, it shall contain the identifier of the SMF. | DTSSA |
| pduSessionId | PduSessionId | C | 0...1 | This IE shall be present during an EPS to 5GS Idle mode mobility or handover preparation using the N26 interface. When present, it shall be set to the PDU Session ID. | |
| hSmfServiceInstanceId | string | O | 0...1 | When present, this IE shall contain the serviceInstanceId of the H-SMF service instance serving the PDU session, for a HR PDU session. This IE may be used by the V-SMF to identify PDU sessions affected by a failure or restart of the H-SMF service (see clause 6.2 of 3GPP TS 23.527 [24]). | |

TABLE 4-continued

Definition of type PduSessionCreatedData (adaptation of Table 6.1.6.2.10-1 of 3GPP TS 29.502)

| Attribute name | Data type | P | Cardinality | Description | Applicability |
|---|---|---|---|---|---|
| smfServiceInstanceId | string | O | 0 ... 1 | When present, this IE shall contain the serviceInstanceId of the SMF service instance serving the PDU session, for a PDU session with an I-SMF. This IE may be used by the I-SMF to identify PDU sessions affected by a failure or restart of the SMF service (see clause 6.2 of 3GPP TS 23.527 [24]). | DTSSA |
| ... | ... | | | | |
| interPlmnApiRoot | URI | O | 0 ... 1 | ApiRoot of the PDU session URI to be used in inter-PLMN signalling targeting the PDU session context. | |
| intraPlmnApiRoot | URI | O | 0 ... 1 | ApiRoot of the PDU session URI to be used in intra-PLMN signalling targeting the PDU session context. | |

For both options 2A and 2B:

The NFc in the source PLMN stores the intra-PLMN root and inter-PLMN root of the resource URI and transfers them to the target PLMN during inter-PLMN mobility.

This includes transferring the information between AMFs (e.g. transfer of the I-SMF/V-SMF SM context reference) and between V-/I-SMFs (e.g. transfer of the anchor SMF PDU session context reference).

This means that:

the AMF stores the intra and inter PLMN apiRoot received for the SM context from the I-SMF, V-SMF or (if no V/I-SMF) from the anchor SMF, and during an inter-AMF mobility, the S-AMF shall transfer both apiRoots to the T-AMF (per SM context), e.g. relying on the AMF Communication service extensions, explained as an extension of 3GPP TS 29.518 in Table 5 (in bold).

TABLE 5

Definition of type PduSessionContext (adaptation of Table 6.1.6.2.37-1 of 3GPP TS 29.518)

| Attribute name | Data type | P | Cardinality | Description | Applicability |
|---|---|---|---|---|---|
| pduSessionId | PduSessionId | M | 1 | Indicates the identifier of the PDU Session. | |
| smContextRef | Uri | M | 1 | Indicates the resource URI of the SM context, including the apiRoot (see clause 6.1.3.3.2 of 3GPP TS 29.502 [16]). When present, it shall carry the URI of SM Context of: I-SMF, for a PDU session with I-SMF; or V-SMF, for HR PDU session; or SMF, for non-roaming PDU session without I-SMF, or LBO roaming PDU session; | |
| sNssai | Snssai | M | 1 | Indicates the associated S-NSSAI for the PDU Session. | |
| ... | ... | | | | |
| interPlmnApiRootURI | | O | 0 ... 1 | ApiRoot of the SM context URI to be used in inter-PLMN signalling targeting the SM context. | |
| intraPlmnApiRootURI | | O | 0 ... 1 | ApiRoot of the SM context URI to be used in intra-PLMN signalling targeting the SM context. | |

The SMF, V-SMF and I-SMF may store the intra PLMN apiRoot and inter PLMN apiRoot received for the PDU session context from the SMF, and during a scenario with an I-SMF or V-SMF insertion/change/removal, the new I-SMF, V-SMF or the anchor SMF retrieves them in the SM context in the SM Context retrieval service operation, e.g. by extending the SmContext data type as shown in Table 6 in TS 29.502 as follows:

necessary, overwrites the apiRoot of the pduSessionRef with the intra-PLMN or inter-PLMN apiRoot (as appropriate).

Part 3):

An NFc (e.g. V/I-SMF) in the target PLMN may discover the intra-PLMN or inter-PLMN apiRoot it should use for sending a request targeting the resource of the NFp, by interacting with the NRF.

TABLE 6

Definition of type SMContext (adaptation of Table 6.1.6.2.39-1 of 3GPP TS 29.502)

| Attribute name | Data type | P | Cardinality | Description |
| --- | --- | --- | --- | --- |
| pduSessionId | PduSessionId | M | 1 | This IE shall contain the PDU Session ID. |
| dnn | Dnn | M | 1 | This IE shall contain the UE requested DNN of the PDU session. The DNN shall be the full DNN (i.e. with both the Network Identifier and Operator Identifier) for a HR PDU session, and it should be the full DNN in LBO and non-roaming scenarios. If the Operator Identifier is absent, the serving core network operator shall be assumed. |
| hSmfUri | Uri | C | 0 . . . 1 | This IE shall be present in HR roaming scenarios. When present, it shall contain the API URI of the Nsmf_PDUSession service of the H-SMF. The API URI shall be formatted as specified in clause 6.1.1. |
| pduSessionRef | Uri | C | 0 . . . 1 | This IE shall be present for a HR PDU session or a PDU session with an I-SMF. When present, this IE shall include the absolute URI of the PDU Session in H-SMF or SMF, including apiRoot (see clause 6.1.3.6.2) |
| hSmfInstanceId | NfInstanceId | C | 0 . . . 1 | This IE shall be present for a HR PDU session. When present, it shall contain the identifier of the home SMF. |
| smfInstanceId | NfInstanceId | C | 0 . . . 1 | This IE shall be present for a PDU session with an I-SMF. When present, it shall contain the identifier of the SMF. |
| hSmfServiceInstanceId | string | O | 0 . . . 1 | This IE may be present for a HR PDU session. When present, this IE shall contain the serviceInstanceId of the H-SMF service instance serving the PDU session. This IE may be used by the V-SMF to identify PDU sessions affected by a failure or restart of the H-SMF service (see clause 6.2 of 3GPP TS 23.527 [24]). |
| interPlmnApiRoot | URI | O | 0 . . . 1 | ApiRoot of the PDU session URI to be used in inter-PLMN signalling targeting the PDU session context. |
| intraPlmnApiRoot | URI | O | 0 . . . 1 | ApiRoot of the PDU session URI to be used in intra-PLMN signalling targeting the PDU session context. |
| . . . | . . . | | | |

For both options 2A and 2B, upon inter-PLMN mobility: the target AMF checks the apiRoot of the pduSessionRef received from the S-AMF and overwrite the apiRoot of the smContextRef with the received intra-PLMN or Inter-PLMN apiRoot as appropriate, and sends the resulting smContextRef in the Create SM context request towards the target V-SMF, I-SMF or towards the anchor SMF.

In some example embodiments, S-AMF decides on the appropriate apiRoot (intra-PLMN apiRoot or inter-PLMN apiRoot) and forwards only this apiRoot to target AMF. In this case, target AMF may not check for the appropriate apiRoot.

For N16/N16a signalling (i.e. between V-/I-SMF and the anchor SMF), the target V-SMF or I-SMF after retrieving the SM context from the old V-SMF/I-SMF, checks the apiRoot of the pduSessionRef received from the old V-SMF/I-SMF or received from the anchor SMF, and if More specifically, upon inter-PLMN mobility, the target V-SMF or I-SMF discovers the NF profile of the anchor SMF and optionally of the old I-SMF/V-SMF, from the NRF, by sending an NF Discovery Request request with query parameters identifying the anchor SMF or the old I-SMF/V-SMF. The NF (i.e. SMF) profile returned by the NRF contains information that allows to construct an inter-PLMN apiRoot (for a target V-SMF) or an intra-PLMN apiRoot (for a target I-SMF, if involved). The constructed apiRoot is then used for sending requests targeting the SM context or PDU session resource of the NFp.

The target V-SMF/I-SMF should then behave as described in 1).

Figure 2:
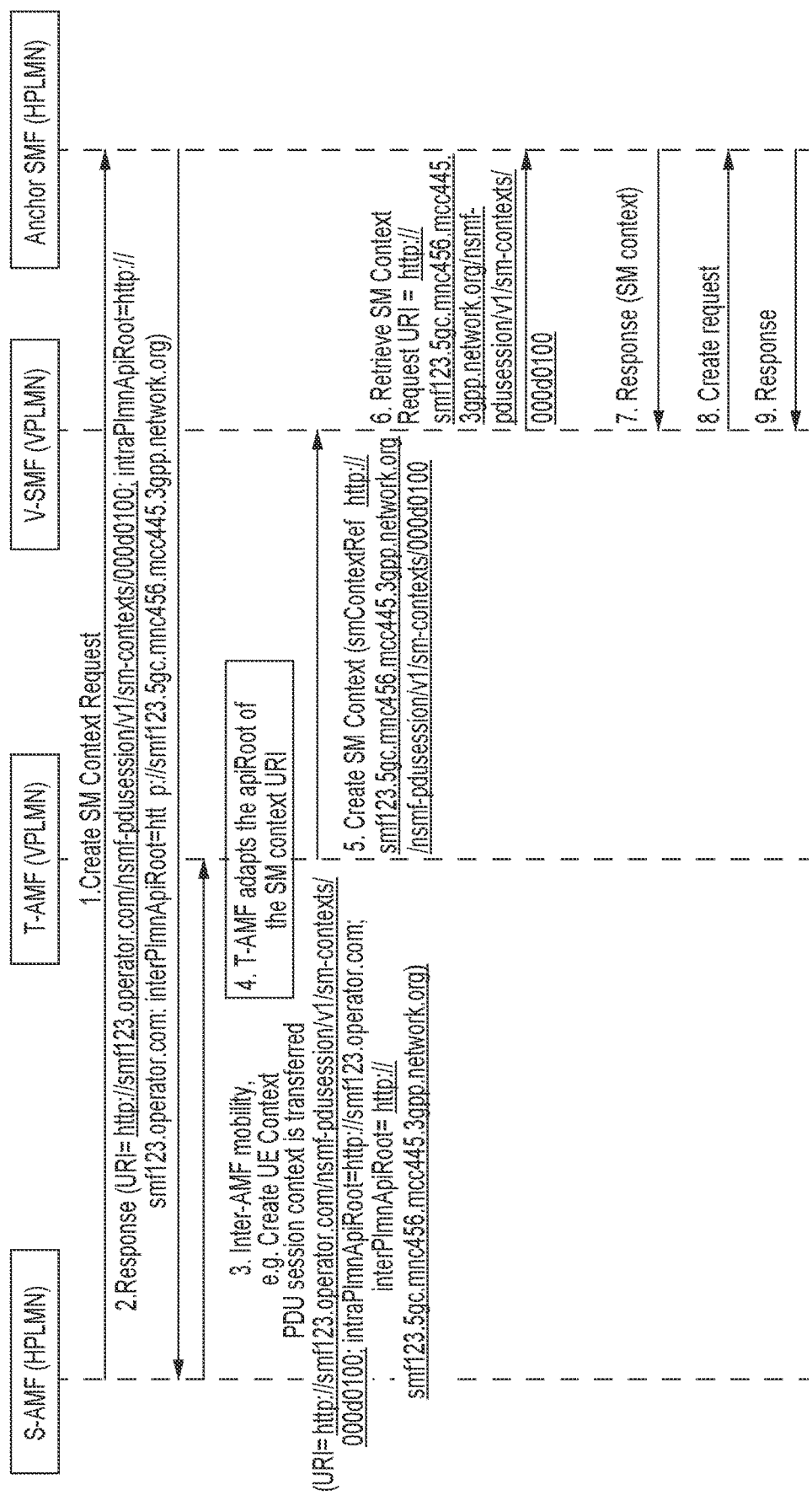
FIG. 2 shows a message sequence chart of an inter-PLMN mobility according to some example embodiments of the invention.
Figure 3:
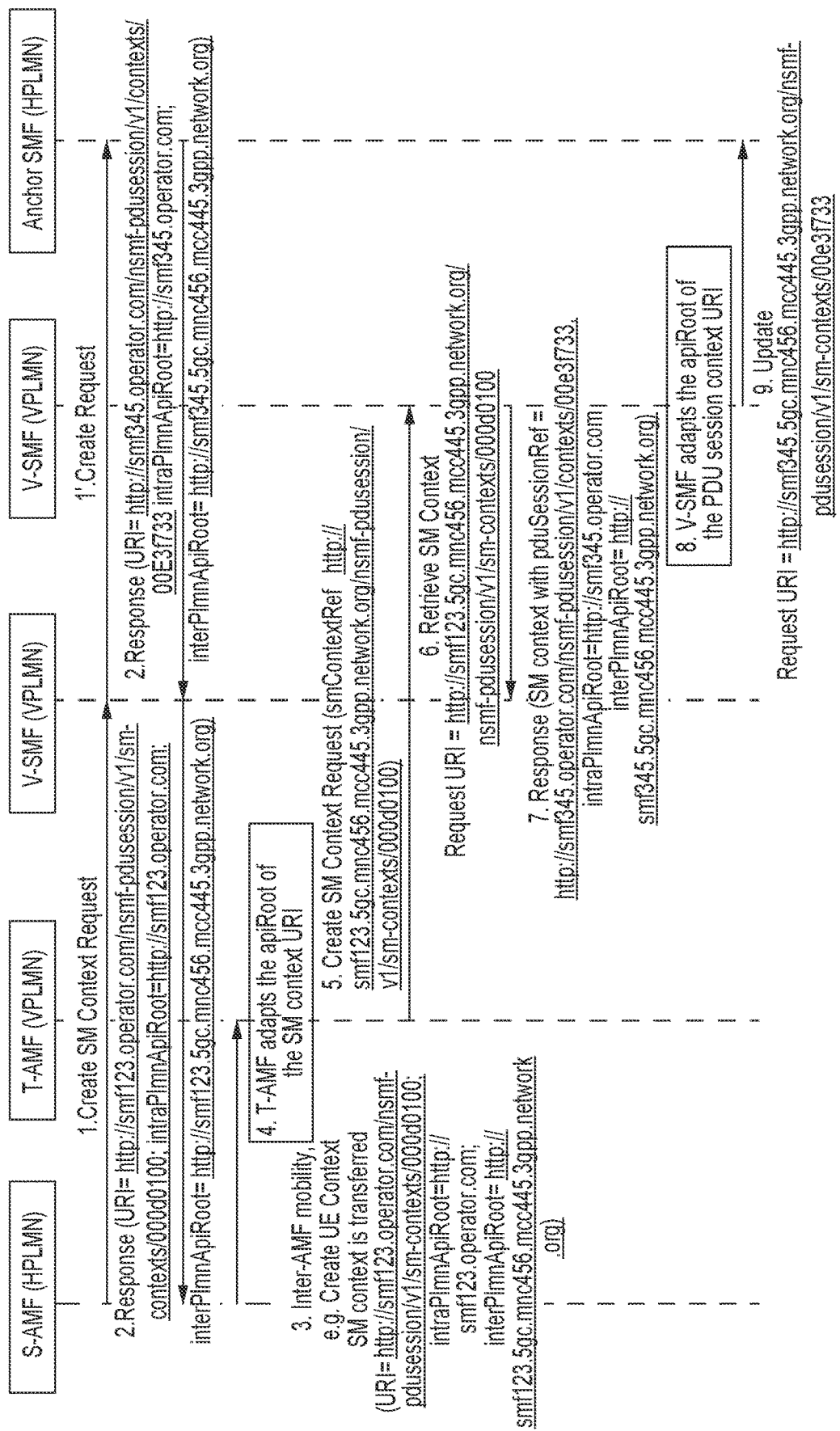
FIG. 3 shows a message sequence chart of an inter-PLMN mobility according to some example embodiments of the invention.
Figure 5:
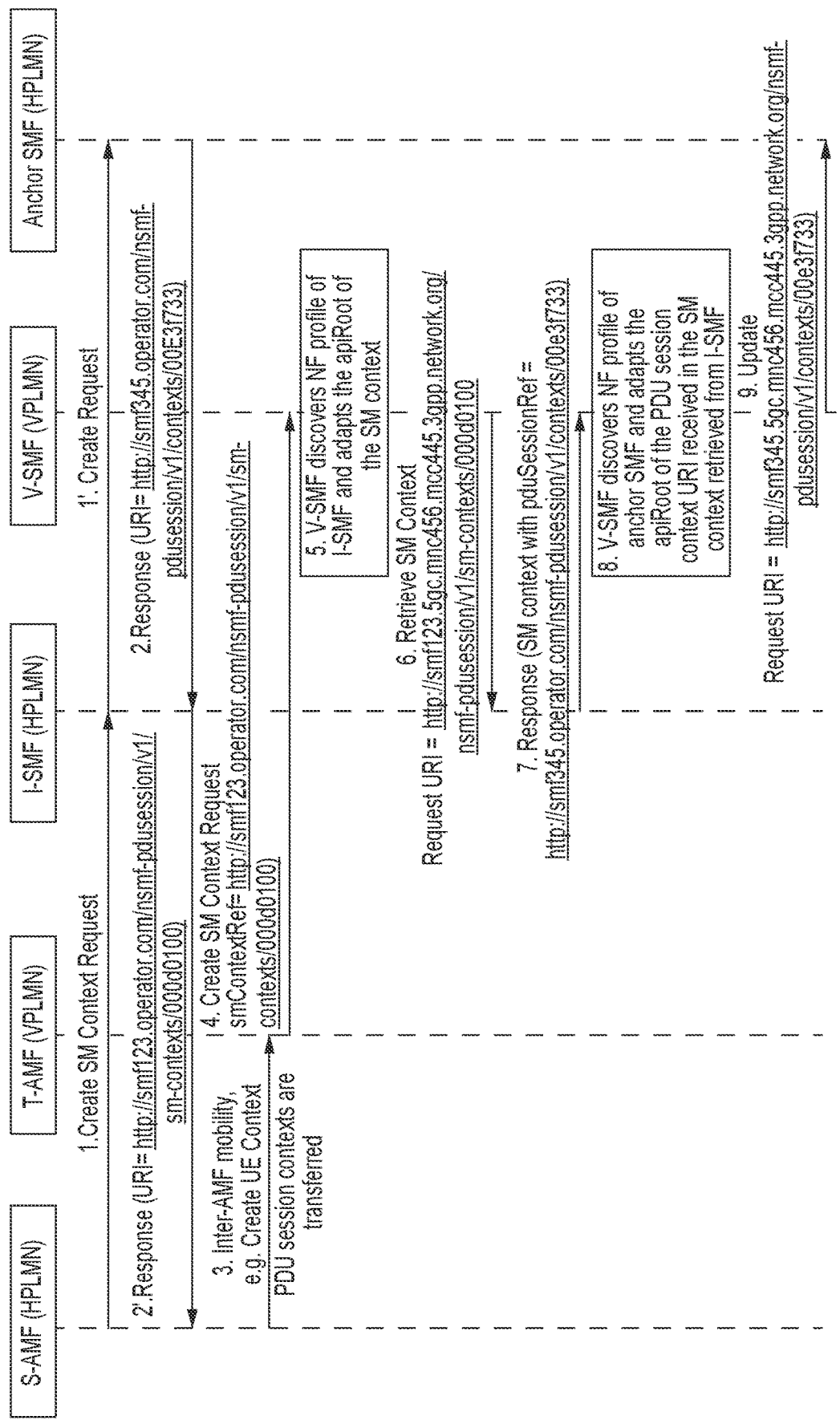
FIG. 5 shows a message sequence chart of an inter-PLMN mobility according to some example embodiments of the invention.

FIGS. 2 to 5 illustrate an example inter-PLMN mobility from an HPLMN to a VPLMN, without and with an I-SMF in the HPLMN. FIGS. 2 and 3 use parts 1&2, FIGS. 4 and 5 use parts 1&3. In detail, FIG. 2 depicts UE mobility from HPLMN to VPLMN, without involving I-SMF in HPLMN (using parts 1 & 2), FIG. 3 depicts UE mobility from HPLMN to VPLMN, with involvement of I-SMF in HPLMN (using parts 1 & 2), FIG. 4 depicts UE mobility from HPLMN to VPLMN, without involving I-SMF in HPLMN (using parts 1 & 3), FIG. 5 depicts UE mobility from HPLMN to VPLMN, with involvement of I-SMF in HPLMN (using parts 1 & 3).

In the examples of FIGS. 2 to 5,

MNC of HPLMN is 456, MCC of HPLMN is 445.

In addition, in the examples of FIGS. 2 and 4 (without I-SMF), anchor SMF in HPLMN is identified as SMF123, SM context is labelled 000d0100 in anchor SMF.

In addition, in the examples of FIGS. 3 and 5 involving I-SMF of HPLMN, anchor SMF in HPLMN is identified as SMF345, SM context is labelled 00E3f733 in anchor SMF in HPLMN, I-SMF in HPLMN is identified as SMF123, SM context is labelled 000d0100 in I-SMF.

The message flow in FIG. 2 is as follows:

1. S-AMF (in HPLMN) requests Anchor SMF (in HPLMN) to create SM context request.
2. Anchor SMF creates SM context and replies with an operator specific URI identifying the anchor SMF and the SM context within the anchor SMF. In addition, the reply comprises an intra-PLMN apiRoot (operator specific) and an inter-PLMN apiRoot comprising the HTTP scheme (HTTP in the example) and a FQDN (at least MCC and MNC of HPLMN).
3. When UE moves to VPLMN, S-AMF forwards the URI and the apiRoots to T-AMF in VPLMN for PDU session context transfer.
4. T-AMF checks that the URI of the SM context is operator specific and replaces the operator-specific apiRoot by the inter-PLMN apiRoot.
5. T-AMF forwards the request received from S-AMF to V-SMF (in VPLMN), wherein the SM context URI comprises the inter-PLMN apiRoot.
6. Thus, V-SMF in VPLMN is enabled to retrieve the SM context from anchor SMF in HPLMN.
7. Anchor SMF provides SM context in response to the request of 6.
8. The V-SMF in VPLMN sends a Create Request to the anchor SMF in HPLMN (mobility scenario). This lets the anchor SMF know that the PDU session is now handled by the V-SMF.
9. The anchor SMF sends a successful response.

The message flow in FIG. 3 is as follows:

1. (and 1') S-AMF (in HPLMN) requests, via I-SMF, Anchor SMF (in HPLMN) to create SM context request.
2. (and 2') Anchor SMF creates a PDU session context and replies with an operator specific URI identifying the anchor SMF and the PDU session context within the anchor SMF. In addition, the reply comprises an intra-PLMN apiRoot (operator specific) and an inter-PLMN apiRoot comprising the HTTP scheme (HTTP in the example) and a FQDN (at least MCC and MNC of HPLMN). I-SMF stores the PDU session context information and also creates an SM context. I-SMF responds with its own identifier, and its own label of the SM context.
3. When UE moves to VPLMN, S-AMF forwards the URI and the apiRoots to T-AMF in VPLMN for SM context/PDU session context transfer.
4. T-AMF checks that the URI of the SM context is operator specific and replaces the operator-specific apiRoot by the inter-PLMN apiRoot.
5. T-AMF forwards the request received from S-AMF to V-SMF (in VPLMN), wherein the SM context URI comprises the inter-PLMN apiRoot.
6. Thus, V-SMF in VPLMN is enabled to request SM context from I-SMF (V-SMF does not know the address of anchor SMF).
7. In response, I-SMF provides to V-SMF the identifier of anchor SMF, the label of PDU session context in anchor SMF and the intra-PLMN and inter-PLMN apiRoot of the PDU session contexts (returned to the I-SMF in action 2.).
8. V-SMF checks that the URI of the PDU session context is operator specific and replaces the operator-specific apiRoot by the inter-PLMN apiRoot.
9. V-SMF then sends an Update Request to the anchor SMF in HPLMN with a request URI constructed with the PDU session URI retrieved in the PDU session context, overwriting the apiRoot with the inter-PLMN apiRoot of the anchor SMF.

The message flow in FIG. 4 is as follows:

1. S-AMF (in HPLMN) requests Anchor SMF (in HPLMN) to create SM context request.
2. Anchor SMF creates SM context and replies with an operator specific URI identifying the anchor SMF and the SM context within the anchor SMF. In this example, the URI in the reply comprises an intra-PLMN apiRoot (operator specific), but the reply does not comprise an inter-PLMN apiRoot comprising a FQDN (at least MCC and MNC of HPLMN).
3. When UE moves to VPLMN, S-AMF forwards the URI (including the intra-PLMN apiRoot) to T-AMF in VPLMN for PDU session context transfer.
4. T-AMF forwards the request to V-SMF.
5. V-SMF discovers NF profile of anchor SMF by sending an NF Discovery Request to the NRF of HPLMN (following e.g. existing inter-PLMN NF discovery procedures). Thus, it obtains in the NF profile all the necessary information to construct the apiRoot for requests it needs to send to the anchor SMF in HPLMN, comprising the HTTP scheme (HTTP in this example, but it could be HTTPS), authority of the anchor SMF, and an optional network deployment string (see apiRoot format in 3GPP TS 29.501).
6. V-SMF retrieves SM context from anchor SMF by sending an Retrieve SM Context Request to the URI of the SM context resource in the anchor SMF, overwriting the apiRoot with the inter-PLMN apiRoot of the anchor SMF
7. Anchor SMF provides SM context in response to 6.
8. The V-SMF in VPLMN sends a Create Request to the anchor SMF in HPLMN (mobility scenario). This lets the anchor SMF know that the PDU session is now handled by the V-SMF.
9. The anchor SMF sends a successful response.

The message flow in FIG. 5 is as follows:

1. (and 1') S-AMF (in HPLMN) requests, via I-SMF, Anchor SMF (in HPLMN) to create SM context request.
2. (and 2') Anchor SMF creates a PDU session context and replies with a operator specific URI identifying the anchor SMF and the PDU session context within the anchor SMF.the URI in the reply comprises an intra-PLMN apiRoot (operator specific), and the reply does not comprise an inter-PLMN apiRoot comprising an HTTP scheme, a FQDN (at least MCC and MNC of HPLMN) and an optional network deployment string. I-SMF stores the PDU session context information and also creates an SM context. I-SMF responds with its own (operator specific) identifier, and its own label of the SM context.

3. When UE moves to VPLMN, S-AMF forwards the URI to T-AMF in VPLMN for PDU session context transfer.
4. T-AMF forwards the request to V-SMF.
5. V-SMF discovers NF profile of I-SMF by sending an NF Discovery Request to the NRF of HPLMN (following e.g. existing inter-PLMN NF discovery procedures). Thus, it obtains in the NF profile all the necessary information to construct the apiRoot for requests it needs to send to the I-SMF in HPLMN, comprising the HTTP scheme (HTTP in this example, but it could be HTTPS), authority of the I-SMF, and an optional network deployment string (see apiRoot format in 3GPP TS 29.501).
6. V-SMF sends a Retrieve SM Context Request to the I-SMF using the apiRoot it has constructed in action 5 (i.e. overwriting the apiRoot of the URI of the SM context received from the S-AMF with the inter-PLMN apiRoot constructed in action 5).
7. I-SMF returns the PDU session context.
   requests it needs to send to the anchor SMF in HPLMN, comprising the HTTP scheme (HTTP in this example, but it could be HTTPS), authority of the anchor SMF, and an optional network deployment string (see apiRoot format in 3GPP TS 29.501).
9. V-SMF then sends an Update Request to the anchor SMF in HPLMN with a request URI constructed with the PDU session URI retrieved in the PDU session context, overwriting the apiRoot with the inter-PLMN apiRoot of the anchor SMF.

For action 4 in FIGS. 4 and 5, the Create SM Context Request of 3GPP TS 29.502 may be extended as shown in bold in Table 7.

For action 5 in FIGS. 4 and 5 and action 8 in FIG. 5, the NRF of the network of the NFp (anchor SMF) to inquire the respective NRF may be determined e.g. by one of the following ways:

- by checking the received apiRoot if it is an inter-PLMN apiRoot; or
- by separate information passed from the source PLMN to the target PLMN identifying the MCC/MNC of the producer network (e.g. storing the MCC/MNC of the producer network (e.g. anchor SMF) in the SM context);
- by the T-AMF knowing the MCC/MNC of the S-AMF, for when the producer is an old I-/V-SMF holding the SM context in the source PLMN.

TABLE 7

Definition of type SmContextCreateData (adaptation of Table 6.1.6.2.2-1 of 3GPP TS 29.502)

| | | | | |
|---|---|---|---|---|
| smContextRef | Uri | C | 0 . . . 1 | This IE shall be present during an I-SMF or V-SMF insertion if available and during an I-SMF or V-SMF change or removal. When present, this IE shall contain the URI of the SM Context resource in the SMF or of the SM context resource in the source I-SMF or V-SMF during an I-SMF or V-SMF insertion or during an I-SMF or V-SMF change/removal respectively. The URI shall be an absolute URI, including apiRoot (see clause 6.1.3.3.2). | DTSSA |
| smContextSmfId | NfInstanceId | O | 0 . . . 1 | This IE may be present if smContextRef is present. When present, this IE shall carry the NF instance ID of the SMF which hosts the SM Context resource identified by smContextRef IE. (NOTE 2) | DTSSA |
| smContextSmfSetId | NfSetId | C | 0 . . . 1 | This IE shall be present, if available. When present, this IE shall contain the NF Set ID of the old V-SMF or the old I-SMF or the SMF as identified by the smContextSmfId. | DTSSA |
| smContextSmfServiceSetId | NfServiceSetId | C | 0 . . . 1 | This IE shall be present, if available. When present, this IE shall contain the NF Service Set ID of the PDUSession service instance (for this SmContext) in the old V-SMF or the old I-SMF or the SMF. | DTSSA |
| smContextSmfServiceInstanceIdstring | | C | 0 . . . 1 | This IE shall be present if smContextRef is present and if this information is available. When present, this IE shall carry the NF Service instance ID of the SMF which hosts the SM Context resource identified by smContextRef IE. (NOTE 2) This IE may be used by the target I-SMF or V-SMF, during an Inter-PLMN mobility, to discover the addressing information to use to retrieve the SM context from the old V-SMF, I-SMF or anchor SMF service instance holding the SM context. | |

8. V-SMF discovers NF profile of anchor SMF by sending an NF Discovery Request to the NRF of HPLMN (following e.g. existing inter-PLMN NF discovery procedures). Thus, it obtains in the NF profile all the necessary information to construct the apiRoot for FIG. 6 shows an apparatus according to an example embodiment of the invention. The apparatus may be a network function (in particular: network function consumer), such as a SMF, or AMF, or PCF, or an element thereof. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for monitoring 110, means for identifying 120, means for deciding 130, first means for sending 140, and second means for sending 150. The means for monitoring 110, means for identifying 120, means for deciding 130, first means for sending 140, and second means for sending 150 may be a monitoring means, identifying means, deciding means, first sending means, and second sending means, respectively. The means for monitoring 110, means for identifying 120, means for deciding 130, first means for sending 140, and second means for sending 150 may be a monitor, identifier, decider, first sender, and second sender, respectively. The means for monitoring 110, means for identifying 120, means for deciding 130, first means for sending 140, and second means for sending 150 may be a monitoring processor, identifying processor, deciding processor, first sending processor, and second sending processor, respectively.

The means for monitoring 110 monitors whether a consumer belonging to a target network receives a specific identifier of a resource, a first apiRoot identifying a producer, and a second apiRoot identifying the producer and a producer network (S110). The first apiRoot is suitable for routing a first service request within the producer network to the producer. The second apiRoot is suitable for routing a second service request from the target network to the producer in the producer network if the target network is different from the producer network. The first apiRoot is different from the second apiRoot. For example, the second apiRoot comprises MCC and MNC of the producer network, while the first apiRoot does not comprise at least one of MCC and MNC of the producer network. The first service request requests a service related to the resource. The second service request requests the service (i.e., the same service) related to the resource.

If the consumer receives the specific identifier, the first apiRoot, and the second apiRoot (S110=yes), the means for identifying 120 identifies the producer network based on the second apiRoot (S120). The means for deciding 130 decides whether the target network is different from the producer network (S130).

If the target network is not different from the producer network (S130=no), the first means for sending sends the first service request (S140). In the first service request, the resource is identified by the first apiRoot and the specific identifier.

If the target network is different from the producer network (S130=yes), the second means for sending 150 sends the second service request (S150). In the second service request, the resource is identified by the second apiRoot and the specific identifier.

FIG. 8 shows an apparatus according to an example embodiment of the invention. The apparatus may be a network function (in particular: network function consumer), such as a SMF, or AMF, or PCF, or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for monitoring 210, means for inquiring 230, means for identifying 220, means for deciding 240, first means for constructing 250, first means for sending 260, second means for constructing 270, and second means for sending 280. The means for monitoring 210, means for inquiring 230, means for identifying 220, means for deciding 240, first means for constructing 250, first means for sending 260, second means for constructing 270, and second means for sending 280 may be a monitoring means, inquiring means, identifying means, deciding means, first constructing means, first sending means, second constructing means, and second sending means, respectively. The means for monitoring 210, means for inquiring 230, means for identifying 220, means for deciding 240, first means for constructing 250, first means for sending 260, second means for constructing 270, and second means for sending 280 may be a monitor, inquirer, identifier, decider, first constructor, first sender, second constructor, and second sender, respectively. The means for monitoring 210, means for inquiring 230, means for identifying 220, means for deciding 240, first means for constructing 250, first means for sending 260, second means for constructing 270, and second means for sending 280 may be a monitoring processor, inquiring processor, identifying processor, deciding processor, first constructing processor, first sending processor, second constructing processor, and second sending processor, respectively.

The means for monitoring 210 monitors whether a consumer belonging to a target network receives a specific identifier of a first resource and a single one of a first apiRoot of a first producer and a second apiRoot of the first producer (S210). I.e., the means for monitoring 210 monitors whether the consumer receives the specific identifier and either the first apiRoot of the first producer or the second apiRoot of the first producer.

The first apiRoot of the first producer identifies the first producer and is suitable for routing a first service request within a first producer network to the first producer. The second apiRoot of the first producer identifies the first producer, comprises an identification of the first producer network, and is suitable for routing a second service request from the target network to the first producer in the first producer network if the target network is different from the first producer network. For example, the second apiRoot comprises MCC and MNC of the producer network, while the first apiRoot does not comprise at least one of MCC and MNC of the producer network. The first apiRoot of the first producer is different from the second apiRoot of the first producer. The first service request requests a service related to the first resource. The second service request requests the service (i.e., the same service) related to the first resource.

If the consumer receives the specific identifier of the first resource, and the single one of the first apiRoot of the first producer and the second apiRoot of the first producer (S210=yes), the means for identifying (S220) identifies a second repository function storing a network function profile of the second producer (S220). The identification may be performed by existing inter-PLMN NF discovery procedures, e.g. as explained with respect to action 5 of FIGS. 4 and 5 and action 8 of FIG. 5. The means for inquiring 230 inquires a first repository function for the network function profile of the first producer (S230). The network function profile of the first producer comprises the identification of the first producer network and information allowing to construct the first apiRoot of the first producer and the second apiRoot of the first producer. The means for deciding 240 decides if the target network is different from the first producer network (S240).

If the target network is different from the first producer network (S240=yes) and the consumer receives the first apiRoot of the first producer in S210, the second means for constructing 270 constructs the second apiRoot of the first producer based on the network function profile of the first producer (S270). Then, the second means for sending 280 sends the second service request (S280). In the second service request, the first resource is identified by the second apiRoot of the first producer and the specific identifier of the first resource.

If the target network is not different from the first producer network (S240=no, i.e., the target network is the same as the first producer network) and the consumer receives the second apiRoot of the first producer in S210, the first means for constructing 250 constructs the first apiRoot of the first producer based on the network function profile of the first producer. Then, the first means for sending 260 sends the first service request (S260). In the first service request, the first resource is identified by the first apiRoot of the first producer and the specific identifier of the first resource.

FIG. 10 shows an apparatus according to an example embodiment of the invention. The apparatus may be a network function (in particular: network function producer), such as a SMF or a PCF, or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for monitoring 310 and means for providing 320. The means for monitoring 310 and means for providing 320 may be an monitoring means and providing means, respectively. The means for monitoring 310 and means for providing 320 may be an monitor and provider, respectively. The means for monitoring 310 and means for providing 320 may be an monitoring processor and providing processor, respectively.

The means for monitoring 310 monitors whether a producer belonging to a producer network produced a resource due to a received request to produce the resource (S310).

If the resource is produced (S310=yes), the means for providing 320 provides a response to the received request (S320). The response indicates that the resource is produced. The response comprises a specific identifier of the resource, a first apiRoot, and a second apiRoot.

The first apiRoot is suitable for routing a first service request within the producer network to the producer. The second apiRoot is suitable for routing a second service request from another network different from the producer network to the producer in the producer network. For example, the second apiRoot comprises MCC and MNC of the producer network, while the first apiRoot does not comprise at least one of MCC and MNC of the producer network. The first apiRoot is different from the second apiRoot. The first service request requests a service related to the resource. The second service request requests the service (i.e., the same service) related to the resource.

FIG. 12 shows an apparatus according to an example embodiment of the invention. The apparatus may be a network function (in particular: network function consumer), such as an AMF, or a SMF, or a PCF, or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for monitoring 410 and means for providing 420. The means for monitoring 410 and means for providing 420 may be an monitoring means and providing means, respectively. The means for monitoring 410 and means for providing 420 may be an monitor and provider, respectively. The means for monitoring 410 and means for providing 420 may be an monitoring processor and providing processor, respectively.

The means for monitoring 410 monitors whether a response to a request from a source network function belonging to a source network to a producer belonging to a producer network comprises a specific identifier of a resource, a first apiRoot, and a second apiRoot (S410). The request requests to produce the resource.

The first apiRoot is suitable for routing a first service request within the producer network to the producer. The second apiRoot is suitable for routing a second service request from the target network to the producer in the producer network if the target network is different from the producer network. For example, the second apiRoot comprises MCC and MNC of the producer network, while the first apiRoot does not comprise at least one of MCC and MNC of the producer network. The first apiRoot is different from the second apiRoot. The first service request requests a service related to the resource. The second service request requests the service (i.e., the same service) related to the resource.

If the response comprises the specific identifier of the resource, the first apiRoot, and the second apiRoot (S410=yes), the means for providing 420 provides the specific identifier, the first apiRoot, and the second apiRoot to a consumer belonging to a target network (S420).

FIG. 14 shows an apparatus according to an example embodiment of the invention. The apparatus may be a network function (in particular: network function consumer), such as an AMF, or a SMF, or a PCF, or an element thereof. FIG. 15 shows a method according to an example embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for monitoring 510, means for identifying 515, means for deciding 520, first means for providing 530, and second means for providing 540. The means for monitoring 510, means for identifying 515, means for deciding 520, first means for providing 530, and second means for providing 540 may be a monitoring means, identifying means, deciding means, first providing means, and second providing means, respectively. The means for monitoring 510, means for identifying 515, means for deciding 520, first means for providing 530, and second means for providing 540 may be a monitor, identifier, decider, first provider, and second provider, respectively. The means for monitoring 510, means for identifying 515, means for deciding 520, first means for providing 530, and second means for providing 540 may be a monitoring processor, identifying processor, deciding processor, first providing processor, and second providing processor, respectively.

The means for monitoring 510 monitors whether a response to a request from a source network function belonging to a source network to a producer belonging to a producer network comprises a specific identifier of a resource, a first apiRoot, and a second apiRoot (S510). The request requests to produce the resource.

The first apiRoot is suitable for routing a first service request within the producer network to the producer. The second apiRoot is suitable for routing a second service request from the target network to the producer in the producer network if the target network is different from the producer network. For example, the second apiRoot comprises MCC and MNC of the producer network, while the first apiRoot does not comprise at least one of MCC and MNC of the producer network. The first apiRoot is different from the second apiRoot. The first service request requests a service related to the resource. The second service request requests the service (i.e., the same service) related to the resource.

If the response comprises the specific identifier of the resource, the first apiRoot, and the second apiRoot (S510=yes), the means for identifying 515 identifies the producer network based on the second apiRoot (S515). The means for deciding 520 decides whether a target network is different from the producer network (S520).

If the target network is not different from the producer network (S520=no, i.e., the target network is the same as the producer network), the first means for providing 530 provides the specific identifier and the first apiRoot to a consumer belonging to the target network (S530). The first means for providing 530 does not provide the second apiRoot to the consumer.

If the target network is different from the producer network (S520=yes), the second means for providing 540 provides the specific identifier and the second apiRoot to the consumer belonging to the target network (S540). The second means for providing 540 does not provide the first apiRoot to the consumer.

FIG. 16 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least the method according to at least one of FIGS. 7, 9, 11, 13, and 15 and related description.

Some example embodiments of the invention are explained for a case that a UE moves from a source network to a target network. However, the invention is not limited to such a case. It may be adopted in any case if a second network (e.g. target network) retrieves a resource from a first network (e.g. source network).

In some example embodiments, such as those of FIGS. 2 to 5, the producer provides, to identify the resource, a URI comprising an apiRoot of one type (inter-PLMN or intra-PLMN), and in addition two apiRoots of different types (inter-PLMN and intra-PLMN). In some example embodiments, the producer provides, to identify the resource, the URI comprising the apiRoot of one type and in addition the apiRoot of the other type but not the apiRoot of the one type.

Some example embodiments are explained with respect to a 5G network. However, the invention is not limited to 5G. It may be used in other service based networks providing mobility, too, e.g. in previous of forthcoming generations of 3GPP networks such as 4G, 6G, or 7G, etc. It may be used in non-3GPP mobile communication networks, too.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a network function (such as a NFp or NFc, in particular: an AMF or SMF) or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The phrase "at least one of A and B" comprises the options only A, only B, and both A and B. The terms "first X" and "second X" include the options that "first X" is the same as "second X" and that "first X" is different from "second X", unless otherwise specified.

The invention claimed is:

1. An apparatus, comprising:
one or more processors; and
at least one memory storing instructions that, when executed by the one or more processors, cause the apparatus to perform:
monitoring whether a consumer belonging to a target network receives a specific identifier of a resource, a first apiRoot identifying a producer, and a second apiRoot identifying the producer and a producer network; wherein
the first apiRoot is suitable for routing a first service request within the producer network to the producer,
the second apiRoot is suitable for routing a second service request from the target network to the producer in the producer network if the target network is different from the producer network;
the first apiRoot is different from the second apiRoot;
the first service request requests a service related to the resource;

the second service request requests the service related to the resource; and the instructions, when executed by the one or more processors, further cause the apparatus to perform:

identifying the producer network based on the second apiRoot if the consumer receives the specific identifier, the first apiRoot, and the second apiRoot;

deciding whether the target network is different from the producer network;

if the target network is not different from the producer network: sending the first service request, wherein, in the first service request, the resource is identified by the first apiRoot and the specific identifier;

if the target network is different from the producer network: sending the second service request, wherein, in the second service request, the resource is identified by the second apiRoot and the specific identifier.

2. The apparatus according to claim 1, wherein the sending of the one of the first service request and the second service request comprises:

requesting a network function belonging to the target network to create a context related to the resource.

3. The apparatus according to claim 2, wherein the request to the network function comprises additionally the other one of the first apiRoot and the second apiRoot.

4. The apparatus according to claim 1, wherein the sending of the one of the first service request and the second service request comprises:

requesting the producer to update a context of the resource such that the resource is handled by the consumer.

5. The apparatus according to claim 4, wherein the instructions, when executed by the one or more processors, further cause the apparatus to perform:

supervising whether the consumer retrieves a context of a second resource from an intermediate network function, wherein the monitoring whether the consumer receives the identifier of the first resource, the first apiRoot, and the second apiRoot comprises monitoring whether the consumer receives the identifier of the first resource, the first apiRoot, and the second apiRoot in response to the retrieving of the context of the second resource.

6. The apparatus according to claim 1, wherein the instructions, when executed by the one or more processors, further cause the apparatus to perform:

monitoring whether an intermediate function belonging to a source network receives, in response to a request to create the resource in the producer, a first specific identifier of the resource, the first apiRoot, and the second apiRoot;

creating a context related to the resource in the intermediate function, wherein the context is identified within the intermediate function by a second specific identifier;

and, providing, in a response to a request for the resource received from the consumer, the second specific identifier, a third apiRoot, and a fourth apiRoot, wherein the third apiRoot comprises an identifier of the intermediate function and is suitable for routing the first service request within the source network to the intermediate function;

the fourth apiRoot comprises the identifier of the intermediate function and is suitable for routing the second service request from the target network to the intermediate function in the source network;

the third apiRoot is different from the fourth apiRoot; and within the intermediate function:

the second specific identifier is unambiguously related to the first specific identifier;

the first apiRoot and second apiRoot are unambiguously related to the third apiRoot and fourth apiRoot.

7. The apparatus according to claim 6, wherein the instructions, when executed by the one or more processors, further cause the apparatus to perform:

monitoring whether the intermediate function receives a request to retrieve the context of the resource, wherein the request comprises the second specific identifier and the fourth apiRoot; and the instructions, when executed by the one or more processors, further cause the apparatus to perform:

deriving the first specific identifier, first apiRoot, and second apiRoot based on the second specific identifier;

providing, in response to the request, the first specific identifier, the first apiRoot, and the second apiRoot.

8. The apparatus according to claim 1, wherein the resource is for a terminal, and the terminal has moved from a source network to the target network.

9. The apparatus according to claim 1, wherein the first apiRoot comprises an identifier of the one of the producer, the first producer, and the second producer, respectively, and does not comprise at least one of a network code of the one of the producer network, the first producer network, and the second producer network, respectively, and a country code of the one of the producer network, the first producer network, and the second producer network, respectively, the second apiRoot comprises the identifier of the one of the producer, the first producer, and the second producer, respectively, the network code of the one of the producer network, the first producer network, and the second producer network, respectively, and the country code of the one of the producer network, the first producer network, and the second producer network, respectively;

the identifier of the one of the producer, the first producer, and the second producer, respectively, does not comprise the network code of the one of the producer network, the first producer network, and the second producer network, respectively, and the country code of the one of the producer network, the first producer network, and the second producer network, respectively.

10. The apparatus according to claim 9, wherein the first apiRoot comprises an identification of the one of the producer network, first producer network, and second producer network, respectively.

11. The apparatus according to claim 1, wherein at least one of:

at least one of the producer, the first producer, and the second producer, respectively, corresponds to one of: a session management function and a policy control function;

the consumer corresponds to one of: an access and mobility management function, a session management function, and a policy control function;

at least one of the resource, the first resource, and second resource, respectively, corresponds to one of: a session management context, a packet data unit session context, and a policy control function.

12. An apparatus, comprising:
one or more processors; and
at least one memory storing instructions that, when executed by the one or more processors, cause the apparatus to perform:
monitoring whether a consumer belonging to a target network receives a specific identifier of a first resource and a single one of a first apiRoot of a first producer and a second apiRoot of the first producer, wherein
the first apiRoot of the first producer identifies the first producer and is suitable for routing a first service request within a first producer network to the first producer,
the second apiRoot of the first producer identifies the first producer, comprises an identification of the first producer network, and is suitable for routing a second service request from the target network to the first producer in the first producer network if the target network is different from the first producer network;
the first apiRoot of the first producer is different from the second apiRoot of the first producer;
the first service request requests a first service related to the first resource;
the second service request requests the first service related to the first resource;
a network function profile of the first producer comprises the identification of the first producer network and information allowing to construct the first apiRoot of the first producer and the second apiRoot of the first producer; and
the instructions, when executed by the one or more processors, further cause the apparatus to perform:
identifying a first repository function storing the network function profile of the first producer if the consumer receives the specific identifier of the first resource, and the single one of the first apiRoot of the first producer and the second apiRoot of the first producer;
inquiring the first repository function for the network function profile of the first producer;
deciding if the target network is different from the first producer network;
if the target network is different from the first producer network and the consumer receives the first apiRoot of the first producer:
constructing the second apiRoot of the first producer based on the network function profile of the first producer; and
sending the second service request, wherein, in the second service request, the first resource is identified by the second apiRoot of the first producer and the specific identifier of the first resource;
if the target network is not different from the first producer network and the consumer receives the second apiRoot of the first producer:
constructing the first apiRoot of the first producer based on the network function profile of the first producer; and
sending the first service request, wherein, in the first service request, the first resource is identified by the first apiRoot of the first producer and the specific identifier of the first resource.

13. The apparatus according to claim 10, wherein:
the monitoring comprises monitoring whether the consumer receives a request to create a context associated to the first resource, wherein
the request comprises the specific identifier of the first resource and the single one of the first apiRoot of the first producer and the second apiRoot of the first producer; and
the sending of the one of the first service request and the second service request to the first producer comprises retrieving a context associated to the first resource.

14. The apparatus according to claim 13, wherein the instructions, when executed by the one or more processors, further cause the apparatus to perform:
monitoring whether the consumer receives, in response to the retrieving, a specific identifier of a second resource and a single one of a first apiRoot of a second producer and a second apiRoot of the second producer, wherein
the first apiRoot of the second producer identifies the second producer and is suitable for routing a third service request within a second producer network to the second producer,
the second apiRoot of the second producer identifies the second producer, comprises an identification of the second producer network, and is suitable for routing a fourth service request from the target network to the second producer in the second producer network if the target network is different from the second producer network;
the first apiRoot of the second producer is different from the second apiRoot of the second producer;
the third service request requests a second service related to the first resource;
the fourth service request requests the second service related to the first resource;
a network function profile of the second producer comprises the identification of the second producer network and information allowing to construct the first apiRoot of the second producer and the second apiRoot of the second producer; and
the instructions, when executed by the one or more processors, further cause the apparatus to perform:
identifying a second repository function storing the network function profile of the second producer if the consumer receives the specific identifier of the second resource and the single one of the first apiRoot of the second producer and the second apiRoot of the second producer;
inquiring the second repository function for the network function profile of the second producer;
deciding if the target network is different from the second producer network;
if the target network is different from the second producer network and the consumer receives the first apiRoot of the second producer:
constructing the second apiRoot of the second producer based on the network function profile of the second producer; and
sending the second service request requesting an update of the second resource, wherein, in the second update request, the second resource is identified by the second apiRoot of the second producer and the specific identifier of the second resource;
if the target network is not different from the second producer network and the consumer receives the second apiRoot of the second producer:
constructing the first apiRoot of the second producer based on the network function profile of the second producer; and
sending the first service request requesting the update of the second resource, wherein, in the first service request the second resource is identified by the first apiRoot of the second producer and the specific identifier of the second resource.

15. The apparatus according to claim 12, wherein the first resource is for a terminal, and the terminal has moved from a source network to the target network.

16. An apparatus, comprising:
one or more processors; and
at least one memory storing instructions that, when executed by the one or more processors, cause the apparatus to perform:
monitoring whether a producer belonging to a producer network produced a resource due to a received request to produce the resource;
providing a response to the received request that the resource is produced if the resource is produced, wherein
the response comprises a specific identifier of the resource, a first apiRoot, and a second apiRoot,
the first apiRoot is suitable for routing a first service request within the producer network to the producer,
the second apiRoot is suitable for routing a second service request from a target network different from the producer network to the producer in the producer network;
the first apiRoot is different from the second apiRoot;
the first service request requests a service related to the resource;
the second service request requests the service related to the resource.

17. An apparatus, comprising:
one or more processors; and
at least one memory storing instructions that, when executed by the one or more processors, cause the apparatus to perform:
monitoring whether a response to a request from a source network function belonging to a source network to a producer belonging to a producer network to produce a resource comprises a specific identifier of the resource, a first apiRoot, and a second apiRoot,
providing the specific identifier, the first apiRoot, and the second apiRoot to a consumer belonging to a target network if the response comprises the specific identifier of the resource, the first apiRoot, and the second apiRoot; wherein
the first apiRoot is suitable for routing a first service request within the producer network to the producer,
the second apiRoot is suitable for routing a second service request from the target network to the producer in the producer network if the target network is different from the producer network;
the first apiRoot is different from the second apiRoot;
the first service request requests a service related to the resource;
the second service request requests the service related to the resource.

18. The apparatus according to claim 17, wherein the resource is for a terminal, and the terminal has moved from the source network to the target network.

19. An apparatus, comprising:
one or more processors; and
at least one memory storing instructions that, when executed by the one or more processors, cause the apparatus to perform:
monitoring whether a response to a request from a source network function belonging to a source network to a producer belonging to a producer network to produce a resource comprises a specific identifier of the resource, a first apiRoot, and a second apiRoot,
identifying the producer network based on the second apiRoot if the response comprises the specific identifier of the resource, the first apiRoot, and the second apiRoot;
deciding whether a target network is different from the producer network;
if the target network is not different from the producer network: providing the specific identifier and the first apiRoot but not the second apiRoot to a consumer belonging to the target network;
if the target network is different from the producer network: providing the specific identifier and the second apiRoot but not the first apiRoot to the consumer belonging to the target network; wherein
the first apiRoot is suitable for routing a first service request within the producer network to the producer,
the second apiRoot is suitable for routing a second service request from the target network to the producer in the producer network if the target network is different from the producer network;
the first apiRoot is different from the second apiRoot;
the first service request requests a service related to the resource;
the second service request requests the service related to the resource.

* * * * *